(12) United States Patent
Dumas et al.

(10) Patent No.: US 10,046,781 B2
(45) Date of Patent: Aug. 14, 2018

(54) WHEELBARROW

(71) Applicant: ERGO MATE PTY LTD, Indooroopilly, QLD (AU)

(72) Inventors: Philip John Dumas, Sylvania (AU); Benjamin Mark Green, Bilambil Heights (AU)

(73) Assignee: ERGO MATE PTY LTD, Indooroopilly (AU)

( * ) Notice: Subject to any disclaimer, the term of this patent is extended or adjusted under 35 U.S.C. 154(b) by 0 days.

(21) Appl. No.: 14/718,505

(22) Filed: May 21, 2015

(65) Prior Publication Data

US 2015/0329131 A1 Nov. 19, 2015

Related U.S. Application Data

(63) Continuation-in-part of application No. PCT/AU2014/000532, filed on May 21, 2014, which
(Continued)

(30) Foreign Application Priority Data

Nov. 21, 2012 (AU) .................................. 2012905063

(51) Int. Cl.
*B62B 1/18* (2006.01)
*B62B 1/20* (2006.01)

(52) U.S. Cl.
CPC ................ *B62B 1/18* (2013.01); *B62B 1/202* (2013.01); *B62B 2301/12* (2013.01)

(58) Field of Classification Search
CPC ....................................................... B62B 1/18
See application file for complete search history.

(56) References Cited

U.S. PATENT DOCUMENTS 3,106,303 A * 10/1963 Finocchiaro ............. A01G 1/12
                                                    15/257.1
5,671,933 A * 9/1997 Tucker ....................... B62B 1/10
                                                    280/47.19
(Continued)

FOREIGN PATENT DOCUMENTS

AU        2012216650 A1    3/2013
DE          20109039 U1    8/2001

OTHER PUBLICATIONS

International Search Report (ISR) for PCT Patent Application PCT/AU2013/001328, dated Feb. 11, 2014.

*Primary Examiner* — Bryan A Evans
(74) *Attorney, Agent, or Firm* — Kirton McConkie; Evan R. Witt

(57) ABSTRACT

A wheelbarrow for carrying materials is described herein, and may include a main frame having first and second spaced-apart elongate longitudinal arms and a support structure configured to engage the ground when the wheelbarrow is in a stationary position, a load carrying container for receiving a load therein, the load carrying container being mounted to and supported by the main frame and configured for supporting a load, an axle mounted to the main frame and below the container, and a ground engaging wheel rotatably mounted on the axle for moving the wheelbarrow in a mobile position. A hollow interior of the load carrying container may have an upper region and a lower region, the upper region located above the ground engaging wheel and extending along a substantial portion of a width of the container.

35 Claims, 14 Drawing Sheets

Related U.S. Application Data is a continuation-in-part of application No. PCT/AU2013/001328, filed on Nov. 19, 2013.

(56) References Cited

U.S. PATENT DOCUMENTS

| | | | | |
|---|---|---|---|---|
| 5,692,761 | A * | 12/1997 | Havlovitz | B62B 1/006 280/33.994 |
| 6,193,265 | B1 * | 2/2001 | Yemini | B60B 37/10 280/47.31 |
| 7,243,939 | B2 * | 7/2007 | Lowe | B62B 1/208 280/42 |
| 7,481,446 | B2 * | 1/2009 | Lowe | B62B 1/208 280/42 |
| 7,950,687 | B2 | 5/2011 | Ludlow | |
| 2005/0275176 | A1 | 12/2005 | Jessop | |
| 2009/0058047 | A1 * | 3/2009 | Brosh | B62B 1/12 280/653 |
| 2009/0295109 | A1 | 12/2009 | Winter et al. | |
| 2011/0272924 | A1 | 11/2011 | Kilen | |
| 2012/0091674 | A1 | 4/2012 | Kartalopoulos | |
| 2012/0126502 | A1 | 5/2012 | Robinson | |
| 2014/0367934 | A1 * | 12/2014 | Ludlow | B62B 1/18 280/47.26 |

* cited by examiner

WHEELBARROW

CROSS REFERENCE TO RELATED APPLICATIONS

This application is a continuation-in-part of and claims the benefit under 35 U.S.C. § 120 to PCT Int'l. Appl. Ser. No. PCT/AU2014/000532 by the inventors, filed May 21, 2014 and pending, which in turn is a continuation-in-part of PCT Int'l. Appl. Ser. No. PCT/AU2013/001328 by the inventors, filed Nov. 19, 2013, pending, which claims the benefit of Australian Provisional Pat. Appl. Ser. No. 2012905063 by the inventors, filed Nov. 21, 2012, expired. The entire contents of each of these applications are hereby incorporated herein.

BACKGROUND

Field

The example embodiments described hereafter relate generally to improvements in wheelbarrows and more particularly, but not by way of limitation, to a wheelbarrow in which the structural shape of the frame and/or positioning of the wheel thereof provide a wheelbarrow which distributes load favorably from the user to the machine, thus reducing the lifting force required.

Related Art

Reference to the prior art herein is not to be taken as an acknowledgement that such prior art constitutes common general knowledge in the art.

Wheelbarrows have been in widespread use for many years for the transportation of loads from one site to another over relatively short distances. Wheelbarrows of different design and configuration comprise a load carrying container supported by a frame having two handles for lifting and pushing, one or two wheels mounted at the front of the container extending downwardly therefrom, and two legs at the rear of the container, also extending downwardly therefrom. When the wheelbarrow is stationary, balancing and stability is maintained by the two rear legs and the one or two front wheels.

The two handles allow the wheelbarrow's supports to be raised from the ground in order to change from the stationary position to the mobile position. In the mobile position, only the wheel is in contact with the ground surface, whilst the operator's legs transfer the balance of the vertical load down and away.

There are a number of drawbacks associated with these conventional wheelbarrows. The single wheel facilitates the manual handling of the load, but the materials carried in the container frequently shift position therein and the balance of the wheelbarrow shifts, making control of the wheelbarrow quite difficult. As a consequence, operation of the normal presently available wheelbarrow by a person of relatively small stature may be extremely difficult, and indeed, even relatively large and powerful persons may encounter difficulties in manipulation of a heavily loaded wheelbarrow. To lift a loaded wheelbarrow, a substantial lifting force is required that depends on the actual load, the position of the center of gravity (CoG) with respect to distance between the CoG and the wheel axle, and on the distance between the handles and the wheel axle, as they are defined by established equations of the lever.

Patent DE20109039 describes a wheelbarrow wherein the bin has a recess for receiving a portion of the wheel, allowing the bin to saddle the wheel. This design has the effect of lowering the floor of the bin and therefore lowering the center of gravity. While this assists in improving the stability of the wheelbarrow it does not assist in reducing the force required to tilt and unload the wheelbarrow, in fact making it more difficult to unload the barrow. Furthermore, when the load is a slurry or is granular, the portion saddling the wheel will deflect inwardly towards the wheel and can result in friction upon the wheel. To ensure this does not happen the portions of the bin saddling the wheel require an additional frame structure which adds weight to the wheelbarrow. Furthermore, as the wheel is partially enclosed, mud, concrete and other debris will eventually accumulate therein, dry and cause friction upon the wheel. As the wheel is partially enclosed it would be difficult to clean this area without having to remove the wheel.

SUMMARY

An example embodiment of the present invention is directed to an improved wheelbarrow that helps to ameliorate some of the shortcomings described above or provide the public with a useful choice. In one aspect, the example embodiment may broadly be directed to a wheelbarrow for carrying materials. The wheelbarrow may include a main frame having first and second spaced-apart elongate longitudinal arms and a support structure configured to engage the ground when the wheelbarrow is in a stationary position; a load carrying container for receiving a load therein, the load carrying container being mounted to and supported by the main frame and configured for supporting a load; an axle mounted to the main frame and below the container; and a ground engaging wheel rotatably mounted on the axle for moving the wheelbarrow in a mobile position. A hollow interior of the load carrying container may have an upper region and a lower region, the upper region located above the ground engaging wheel and extending along a substantial portion of a width of the container.

In an example, the upper region of the container spans across an entirety of the width of the container. In an example, the container is substantially unencumbered by the operation of the ground engaging wheel to provide a substantially planar base adjacent the wheel for loading and unloading of material from the container in an efficient and effective manner.

In an example, the ground engaging wheel is free of encumbrance. In an example, a front end of the upper region extends significantly in front of the axle along a longitudinal axis of the wheelbarrow. In an example, a shoulder region connecting the upper and lower regions is located behind and in substantially close proximity to the axle.

In an example, the lower region is located behind the axle. The lower region effectively locates a substantial portion of the load adjacent the ground engaging wheel. The load is transferred through the main frame to provide direct support to the container. In an example, an end of the upper region distal from the lower region extends beyond an outer most edge of the wheel in a longitudinal direction of the container. In an example, the lower region of the container is located below an uppermost edge of the wheel. In another example, the lower region of the container is located an end of the lower region adjacent the shoulder is located inside of an innermost periphery of the wheel.

In an example, a volume of the upper portion is approximately between 10% and 50% of a volume of container. In another example, a volume of the upper portion is approximately between 15% and 40% of a volume of container. In a further example, the volume of the upper portion may be approximately between 20% and 30% of a volume of container.

In an example, the container comprises a floor having an upper level associated with the upper region and a lower level associated with the lower region, and a shoulder portion between the upper and lower levels. In an example, the shoulder portion is ramped. In an example, the upper level and lower lever are substantially planar. In an example, a height of an upper peripheral edge of the container is substantially constant along a substantial length of the edge.

In an example, a center of gravity of the wheelbarrow (CoG) or an axis of the CoG extending substantially perpendicular to a longitudinal axis of the wheelbarrow (hereinafter referred to as CoG axis), in a stationary and non-lifted state of the wheelbarrow, is located proximate or at the shoulder portion and behind to reduce a distance of an effective lever arm between the CoG axis and the wheel.

In an example, each elongate arm of the main frame extends longitudinally along an underside of the container to provide support to the container. In another example, each elongate arm of the main frame extends laterally at a user end beyond a rear end of the container. In an example, the user end of each elongate arm extends at an acute angle relative to a longitudinal axis of the wheelbarrow.

In an example, the main frame comprises a pair of elongate handles laterally spaced apart at user ends of the arms. The pair of elongate handles may each comprise a resilient rubber grip located at or close to a terminal end of the first and second arms for gripping by a user.

In an example, the support structure of the main frame comprises first and second leg structures extending laterally from the first and second spaced-apart arms of the main frame respectively. In an example, each of the first and second leg structures is U-shaped to increase an effective area of engagement with the ground in the stationary and un-lifted position of the wheelbarrow to increase stability. In an example, the wheelbarrow further comprises an axle support member extending between and connecting to the first and second elongate arms and either end of the axle respectively. In an example, the axle support member comprises first and second axle support arms connected to either end of the axle and connected to one another at a front end extending beyond an outermost periphery of the wheel.

In an example, a front end of the first and second elongate arms is connected and extends towards and connects to a front end of the axle support member. This provides at least four attachment points for secure fasteners to support the container. The front end of the first and second elongate arms support the upper portion of the container and transfers load contained therein to the wheel axle and the ground engaging wheel through the support member. In an example, the first and second elongate arms and the support structure of the main frame are fabricated from tubular steel.

In an example, the load carrying container has a front wall extending beyond an outer most edge of the wheel. In an example, a distribution of load achieved by the container forms a pivot point for the wheelbarrow located behind and in close proximity to the wheel and below the center of gravity of the wheelbarrow. In an example, the load carrying container is fabricated from a reinforced plastics material sufficiently strong enough for use as a wheelbarrow for transporting materials from one place to another.

In an example, the first and second elongate arms and the support structure are fabricated from steel or metal based material and the load carrying container is molded from a reinforced plastic material sufficiently strong enough for use as a wheelbarrow for transporting materials from one place to another. In an example, the container consists of a reinforced ribbed edge for stiffening of at least the upper portion of the container. In an example, the container consists of countersunk reinforced oversized connection points to reduce interaction with load and distribute force across the reinforced plastic connection points. In an example, the container consist of a stiffened floor to reduce torsional distortion during loading and operation, and increase efficient and effective load transfer to the main frame and ground engaging wheel.

Another example embodiment may be directed to a wheelbarrow for carrying materials. The wheelbarrow may include a main frame having first and second spaced-apart elongate longitudinal arms and a supporting configured to engage the ground when the wheelbarrow is in a stationary position; a load carrying container for receiving a load therein, the load carrying container being mounted to and supported by the main frame and configured for supporting a load; an axle mounted to the main frame and below the container; and a ground engaging wheel rotatably mounted on the axle for moving the wheelbarrow in a mobile position. A hollow interior of the load carrying container may have an upper region and a lower region, the upper region being of a substantial volume relative to the lower region.

Another example embodiment is directed to a wheelbarrow for carrying materials, the wheelbarrow comprising; a main frame defining first and second spaced-apart longitudinal portions; a load carrying portion comprising a front wall and a rear wall adjoined by a pair of opposite side walls and a floor defining a receptacle, the load carrying portion being mounted to the main frame and configured for supporting a load; an axle mounted below the main frame and contained substantially within the first and second spaced apart longitudinal portions; a ground engaging wheel rotatably mounted on the axle for moving the wheelbarrow over the ground; a first leg structure and a second leg structure attached respectively to the first and second spaced apart longitudinal portions configured to engage the ground when the wheelbarrow is in a stationary position; and wherein the load carrying portion has an upper portion and a lower portion separated by a shoulder, the upper portion located above the ground engaging wheel and the lower portion located behind the wheel.

In this example, the main frame may comprise a pair of elongate handles laterally spaced apart and extending rearward from one end of the first and second spaced-apart longitudinal portions. In this example, the main frame, the first leg structure, and second leg structure may be fabricated from tubular steel, In this example, the main frame may further comprise cross brace elements separating the first and second longitudinal portions, the cross brace elements comprising: a first forward cross brace extending between the first and second longitudinal portions and located adjacent to the front wall of the load carrying portion; a second forward cross brace extending between the fast and second longitudinal portions and located proximate to the shoulder at a point adjacent the upper portion of the load carrying portion; a first rearward cross brace extending between the first and second longitudinal portions and located adjacent the rear wall of the load carrying portion; and a second rearward cross brace extending between the first and second longitudinal portions and located proximate to the shoulder at a point adjacent the lower portion of the load carrying portion.

In this example, the frame and cross brace members positioned between the first and second longitudinally extending portions may be positioned substantially under the load carrying portion. In this example, the second rearward cross member may form a pivot point for the wheelbarrow located behind and in close proximity to the wheel and below the center of gravity of the wheelbarrow.

In this example, the wheelbarrow may further comprise a cross brace member located between the first and second longitudinal portions and proximate the pair of elongate handles and adapted to keep the pair of elongate handles spaced apart from each other. In this example, the pair of elongate handles may further comprise resilient rubber grips located at or close to an end of the first and second longitudinal portions for gripping by a user.

In this example, the wheelbarrow may comprise a center of gravity at stationary that may be located proximate the shoulder located between the upper and lower portions and behind the wheel so that the center of gravity is located in close proximity to the wheel to reduce the amount of strength required to lift and move the wheelbarrow.

In this example, the lower portion of the load carrying portion may form a first receptacle for loading materials and the upper portion of the load carrying portion may form a second receptacle for loading materials, wherein when materials are loaded into each receptacle the wheelbarrow is balanced due to the materials being substantially loaded into the lower portion which is substantially formed behind the wheel of the wheelbarrow thereby placing the center of gravity in close proximity to the wheel axle or pivot point to reduce the amount of strength required to lift, move and empty the wheelbarrow.

In this example, the axle mounted ground engaging wheel may extend below the main frame and may be mounted on a support frame comprising elongate members extending from the main frame and located on either side of the axle. In this example, the load carrying portion may have a front wall inclining forwardly-upwardly towards the front edge thereof in a mobile position for emptying its contents on tilting the wheelbarrow forwardly about an axis positioned substantially between and parallel to the wheel axle and the pivot point formed by the second rearward cross member.

In this example, the first and second spaced-apart longitudinal portions may comprise two identical bodies each with a rearward extending handle bar with a grip and a wheel mount extending below each longitudinal portion on which a wheel is pivotally mounted.

In this example, the identical longitudinal portions may be spaced apart by at least one laterally extending element welded at each end between each the longitudinal portion. In this example, the identical longitudinal portions are spaced apart by four laterally extending elements located substantially below the load carrying portion and a further laterally extending element between the handle bars. In this example, the laterally extending elements may be connected to the load carrying portion at points located along the laterally extending element.

In this example, the main frame, the first leg structure, and second leg structure, the at least one laterally extending element may be fabricated from tubular steel and the load carrying portion may be fabricated from a thin sheet metal of sufficient strength for use as a wheelbarrow for transporting materials from one place to another. Alternatively, the main frame, the first leg structure, and second leg structure, the at least one laterally extending element may be constructed from wood and the load carrying portion is molded from a reinforced plastic material sufficiently strong enough for use as a wheelbarrow for transporting materials from one place to another. Alternatively, the main frame, the first leg structure, and second leg structure, the at least one laterally extending element may be fabricated from tubular steel and the load carrying portion is molded from a reinforced plastic material of sufficient strength for use as a wheelbarrow for transporting materials from one place to another.

In accordance with a further aspect, the present invention provides a wheelbarrow comprising: a frame formed from a first longitudinally extending body and a second identical longitudinally extending body with at least one pivot mounted wheel extending from the frame and a pair of handle bars and grips extending rearward from the first and second longitudinally extending bodies, at least two support members extending from the frame upon which the wheelbarrow is supported in the stationary position, and at least one laterally extending element extending between and spacing apart the first and second longitudinally extending bodies; and a load carrying body comprising a front and rear wall adjoined by opposite side walls and a floor defining a receptacle for carrying a load, wherein the load carrying portion has an upper portion and a lower portion separated by a shoulder, the upper portion located above the ground engaging wheel and the lower portion located behind the wheel such that a center of gravity for the wheelbarrow is located in close proximity to the wheel to reduce the amount of strength required to lift and move the wheelbarrow and also changes the lever arm to minimize the moment required to lift the load in the wheelbarrow.

Another example embodiment is directed to a wheelbarrow comprising a main frame, a container secured thereto, the container adapted to receive the load, and a wheel rotatably secured to the main frame at a front end, enabling the wheelbarrow to be moved along a surface. The main frame may include at least two spaced leg members for supporting the wheelbarrow when in a stationary position; and at least two handles extending in a rearward direction relative to the leg members, each handle being spaced from one another such that an operator may stand there between, the at least two handles being distal from the wheel. The container may include a floor and a side wall extending around the floor, with the floor comprising an upper portion having an upper surface located above the wheel when the wheelbarrow is in the stationary position, and a lower portion having a lower surface located below the upper surface and a first end horizontally positioned with respect to the wheel between a horizontal plane extending from the bottom of the wheel and a horizontal plane extending from the top of the wheel when the wheelbarrow is in the stationary position. The wheelbarrow further includes a shoulder portion extending between the upper portion and the lower portion, wherein the position of the upper portion and the lower portion reduce the force required to move or unload the wheelbarrow.

In this example, the upper surface is planar. In another example, the upper surface may be inclined downwardly towards the front of the wheelbarrow. In this example, the upper surface extends across the width of the container. In this example, the upper surface and the portion of sidewall there around define an upper volume. In this example, the upper portion is between 10% and 50% of the total volume of the container.

In this example, the lower surface is planar. In another example, the lower surface may inclined downwardly towards the front of the wheelbarrow. In this example, the lower surface extends across the width of the container The example embodiments provide a wheelbarrow wherein the load within the container is able to be distributed across the wheel, and further provide a container for a wheelbarrow. The container may include a floor and a side wall extending around the floor; with the floor comprising an upper portion having an upper surface to be located above a wheel of the wheelbarrow when the wheelbarrow is in a stationary position, and a lower portion having a lower surface located adjacent to and below the upper surface and a first end horizontally positioned with respect to the wheel between a horizontal plane extending from the bottom of the wheel and a horizontal plane extending from the top of the wheel when the wheelbarrow is in the stationary position. The container further includes a shoulder portion extending between the upper portion and the lower portion, wherein the position of the upper portion and the lower portion reduce the force required to move or unload the wheelbarrow when the container is secured thereto.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

DETAILED DESCRIPTION

Figure 1:
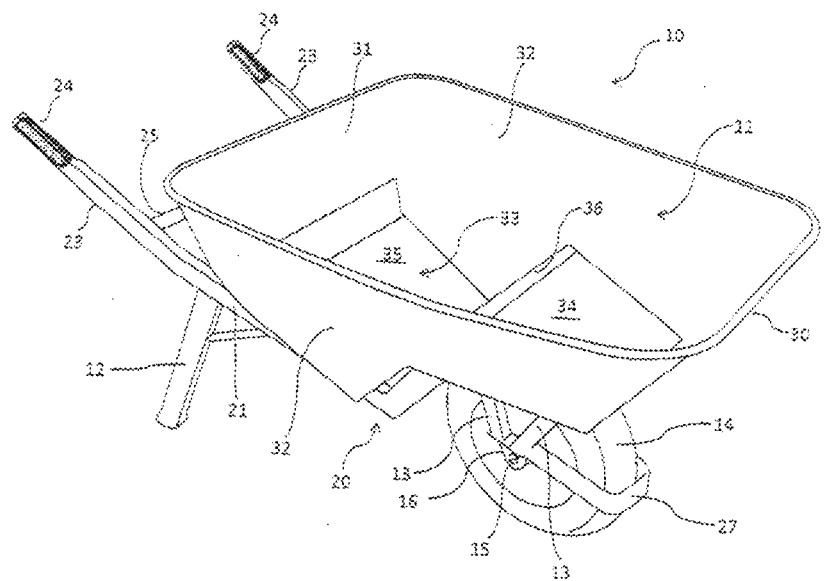
FIG. 1 illustrates a three dimensional view from above of a wheelbarrow in accordance with a first embodiment of the present invention.

In the following description, certain specific details are set forth in order to provide a thorough understanding of various example embodiments of the disclosure. However, one skilled in the art will understand that the disclosure may be practiced without these specific details. In other instances, well-known structures associated with manufacturing techniques have not been described in detail to avoid unnecessarily obscuring the descriptions of the example embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one example embodiment" or "an embodiment" means that a particular feature, structure or characteristic described in connection with the embodiment is included in at least one embodiment. Thus, the appearances of the phrases "in one example embodiment" or "in an embodiment" in various places throughout this specification are not necessarily all referring to the same embodiment. Further, the particular features, structures or characteristics may be combined in any suitable manner in one or more example embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

As used in the specification and appended claims, the terms "correspond," "corresponds," and "corresponding" are intended to describe a ratio of or a similarity between referenced objects. The use of "correspond" or one of its forms should not be construed to mean the exact shape or size.

Any one or more of the example embodiments to be described below can be combined with any one or more of the above aspects.

The disclosure is intended to reference a range of numbers disclosed herein (for example, 1 to 10) and also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "and/or" means "and" or "or", or both, and an "(s)" following a noun means the plural and/or singular forms of the noun.

In this disclosure, when referring to the stationary position of the wheelbarrow, the wheelbarrow is generally in a position wherein the wheel and support assembly/leg members are in contact with the ground. In this position the wheelbarrow may be easily loaded. When referring to the mobile position of the wheelbarrow, the wheelbarrow is generally in a position wherein only the wheel is in contact with the ground. In this position an operator has lifted and maintains the support assembly/leg members from resting on the ground. In this position the wheelbarrow may be easily moved. When referring to the unloading position of the wheelbarrow, the wheelbarrow is generally in a position wherein only the wheel is in contact with the ground and an operator has raised the handles of the wheelbarrow a sufficient height to tilt the wheelbarrow at an angle wherein the contents of the wheelbarrow fall from the wheelbarrow.

The example embodiments of the present invention consist in the foregoing and also envisages constructions of which the following gives examples only. In the drawings, identical reference numbers identify similar elements or acts. The size and relative positions of elements in the drawings are not necessarily drawn to scale.

The following description, given by way of example only, is described in order to provide a more precise understanding of the subject matter of the various example embodiments. The principles of operation of the wheelbarrow according to the example embodiments and how it differentiates from existing ones may be better understood with reference to the drawings and accompanied description.

It is noted that structural members depicted herein are, in an example, of a tubular cross-section, though they may alternatively comprise other cross-section configurations such as square, rectangular, triangular, I-beam, U-beam, C-channel and the like. Structural members may be welded together, though any suitable means or combination of means, such as bolting, may be employed to join members together. The structural members may be fabricated from any of a number of different materials, such as steel, aluminum, reinforced plastics, wood or the like.

For definitional purposes, the following terms will be used for referring to the fully assembled wheelbarrow in normal use. The term "horizontal" refers to the direction parallel to a surface (e.g., ground) on which the wheelbarrow is supported in normal use. The term "vertical" refers to a direction substantially perpendicular to the horizontal direction/supporting surface. The term "front" or "forward" refers to the end of the wheelbarrow proximate to the wheel (described below)/distant from the handles of the wheelbarrow from which a load is normally unloaded. The term "rear" or "rearward" refers to the end opposite the front end of the wheelbarrow from which a user handles the wheelbarrow. The term "longitudinal" means along the center of the wheelbarrow from the front end to the rear end.

Figure 2:
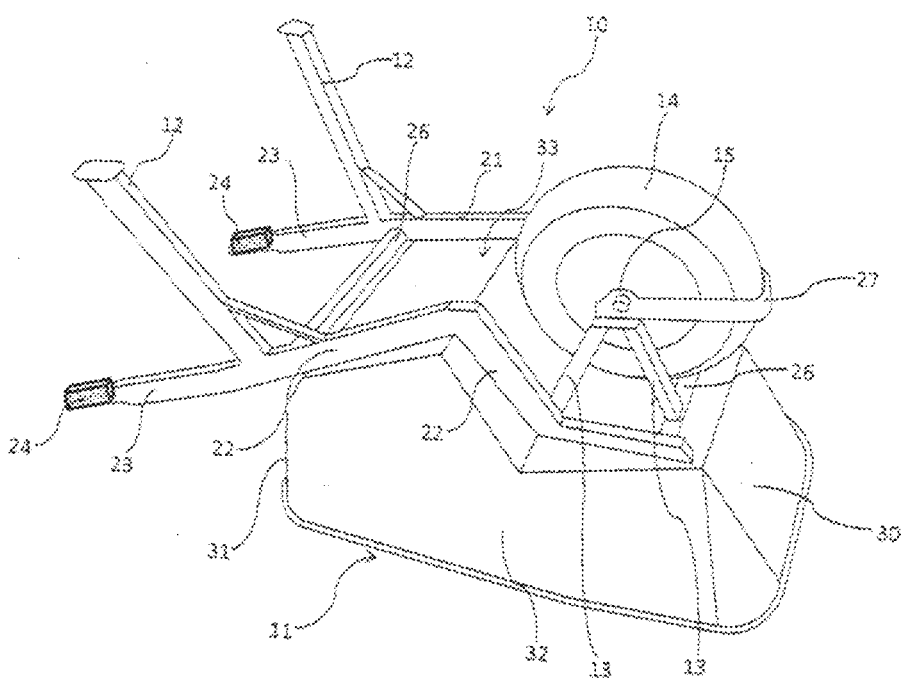
FIG. 2 illustrates a three dimensional view from below of the wheelbarrow of FIG. 1.

Referring to FIGS. 1 and 2 of the drawings, the reference numeral 10 generally designates a wheelbarrow according to a first embodiment of the present invention. The wheelbarrow 10 includes a main frame 20 configured for supporting a container or body 11 (e.g., a tub, receptacle or tray). The main frame 20 further includes an axle 15 on which a wheel 14 are axially mounted for facilitating movement of the wheelbarrow by a person in a conventional manner. The container 11 may be removably secured or permanently attached to the frame 20 in any suitable manner, such as bolts, or the like (not shown), and it is preferable to provide spaced brace members 25, 26 connected between the frame 20 and container 11 for rigidity and strength.

The frame 20 includes a pair of spaced longitudinal arm portions 21, 22 which extend generally through the length of the wheelbarrow 10. The pair of spaced arm portions or members 21 and 22 being substantially disposed at angles with respect to each other with the outer ends located at the rear of the wheelbarrow 10 thereof being disposed at a greater distance apart than the inner ends located at or near the wheel 14 thereof as particularly shown in FIG. 5. The inner ends of the arms 21 and 22 may be connected by crossbars 26 and are secured between the arms 21 and 22 in spaced relation to facilitate support of the container 11. Two further crossbars 26 are secured between the arms 21 and 22 in spaced relation and located rearward of the wheel 14 to further facilitate support of the container 11.

Figure 5:
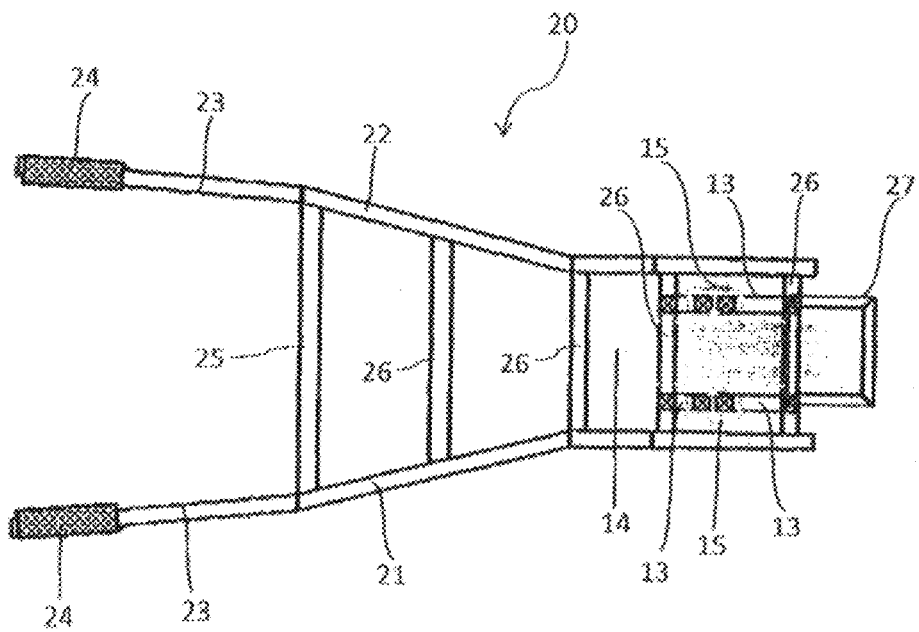
FIG. 5 shows a top view of the wheelbarrow of FIG. 1 with the load carrying container removed for clarity.
Figure 6:
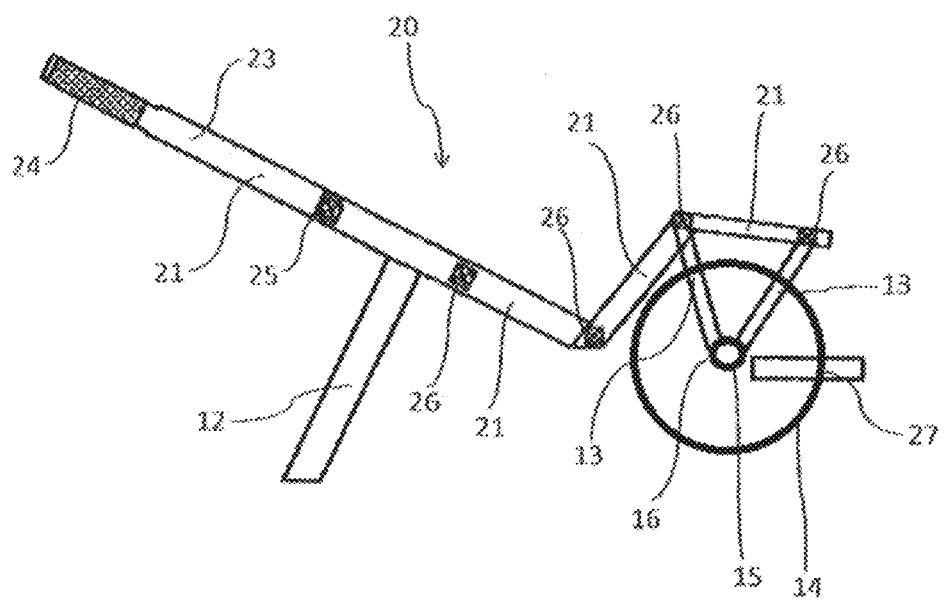
FIG. 6 shows a side view of the wheelbarrow of FIG. 1 with the load carrying container removed for clarity.
Figure 7:
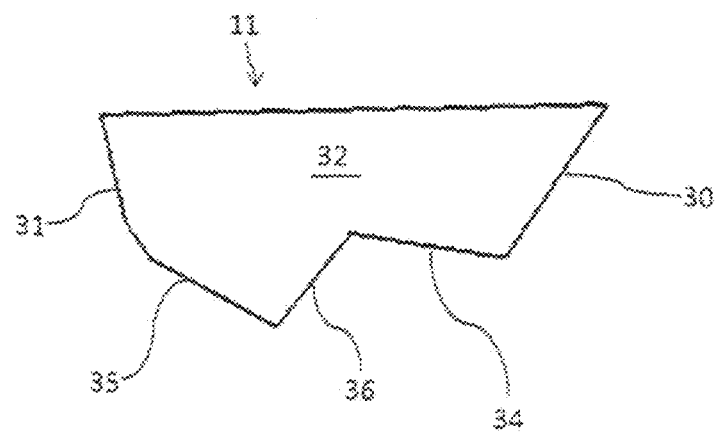
FIGS. 7 to 10 show different views of the load carrying container which in use is mounted on the frame of the wheelbarrow of FIG. 1.
Figure 8:
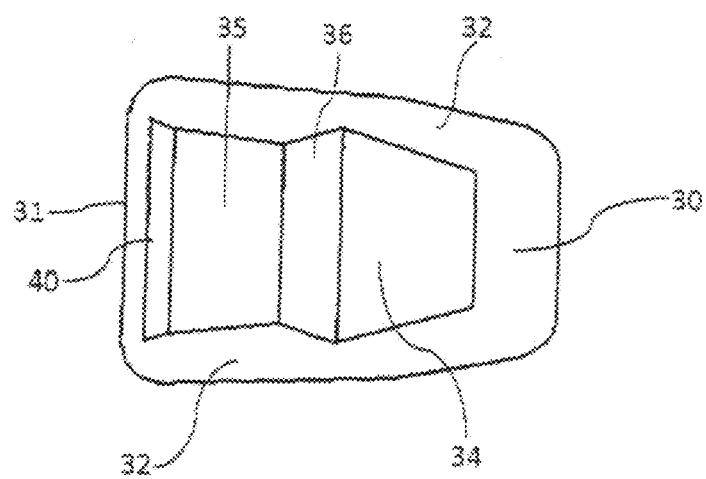
Figure 9:
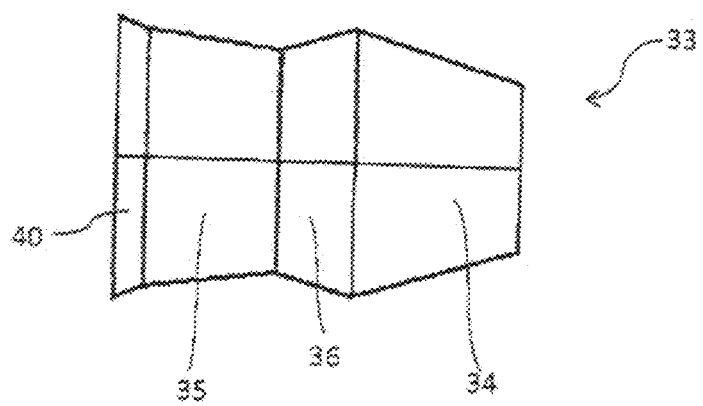
Figure 10:
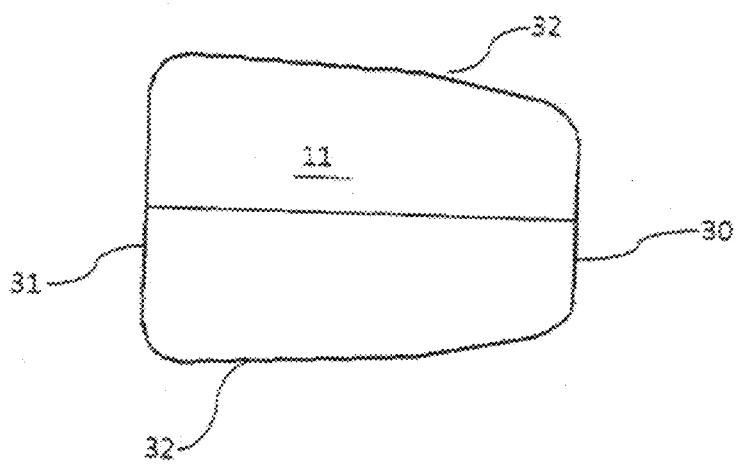

As shown more clearly in FIGS. 5 and 6, the longitudinal portions 21, 22 extend from the wheel 14, and two ends of the longitudinal portions 21, 22 extend rearward from an opposing end of wheel 14 of the wheelbarrow 10 to form handles or handle bars 23, to each of which handgrips 24 are positioned. The handles 23 are for facilitating the manipulation of the wheelbarrow 10. The handgrips 24 comprise a material, such as rubber, nylon, or the like, that is effective for enabling a person to comfortably lift the rear end of wheelbarrow 10 in a conventional manner. In addition, a support assembly 12 is welded or otherwise secured to the frame 20 for engaging the ground and supporting the wheelbarrow 10 in a stationary or stationary position and assists in maintaining the wheelbarrow 10 in an upright position. The support assembly 12 may be of any suitable type, and comprises a pair of spaced leg members 17.

A pair of substantially mutually parallel arms 13 are welded or otherwise secured to the crossbars 26 respectively located at the front end of the wheelbarrow 10, the parallel arms 13 extend at an angle downwardly therefrom for supporting the wheel 14 and axle 15. The wheel 14 may be freely journalled on a pivot shaft or axle generally indicated at 15 in any suitable manner, such as by bearing supports (not shown). The axle 15 comprises a substantially straight central portion connected to the pair of parallel arms 13 located at opposite ends thereof, each of which supports a side of the wheel 14. The axle 15 is secured to the parallel arms 13 by pillow blocks, or the like.

Figure 3:
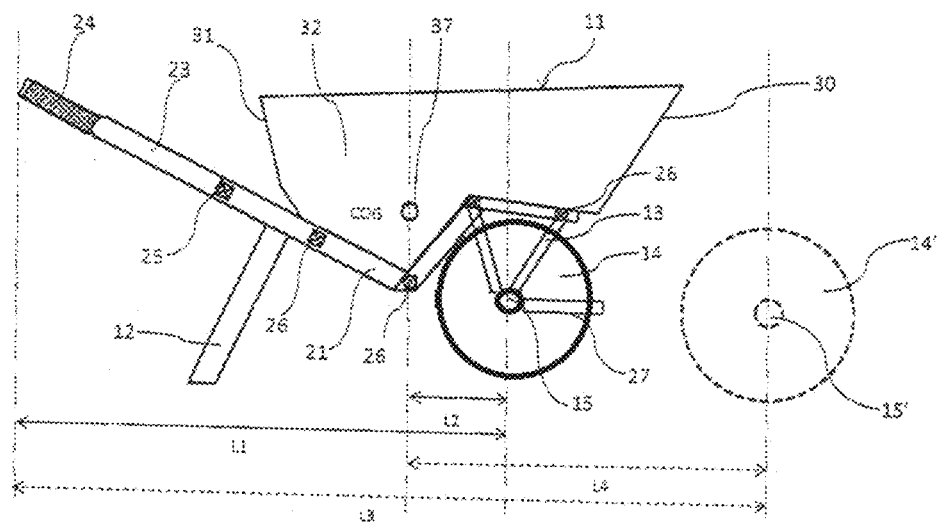
FIG. 3 shows a side view of the wheelbarrow of FIG. 1.
Figure 4:
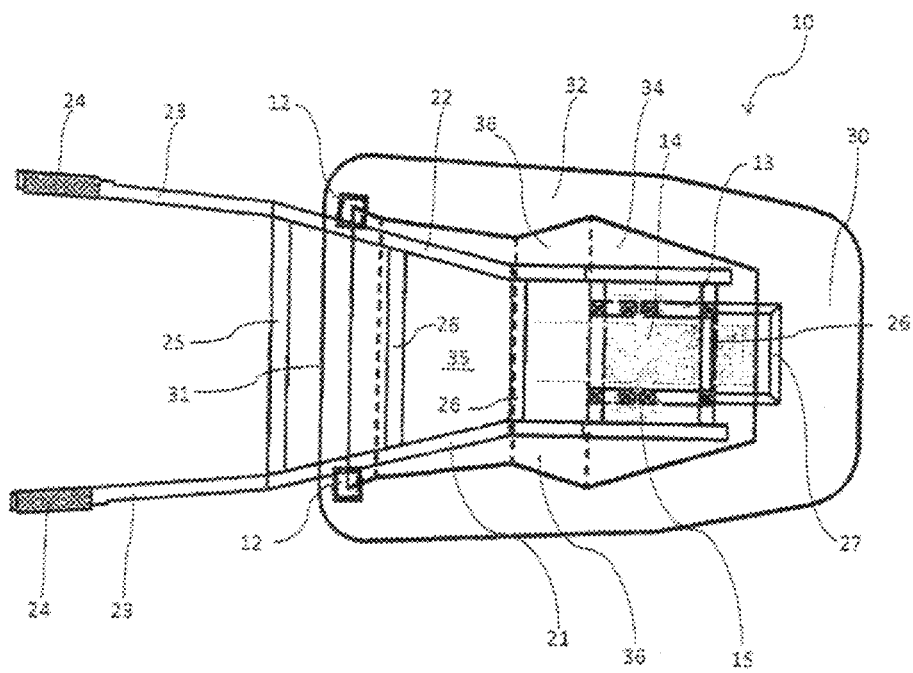
FIG. 4 shows a bottom view of the wheelbarrow of FIG. 1.

The principles and self-balancing and self-stabilizing operation of the wheelbarrow according to the present invention, why and how it differentiates from existing ones may be better understood with reference to FIG. 3.

FIG. 3 show a side view of the wheelbarrow 10 of this invention at stationary to depict the displacement axis of the center of gravity (CoG axis) 37 of the load with respect to the axle 15. It will be appreciated that as the wheelbarrow 10 is lifted, the CoG axis 37 moves forward and nearer the vertical through the axle 15, thus decreasing the distance the CoG axis 37 is from the axle 15. However, the CoG axis 37 still remains rearward with respect to the axle 15 so that stability is maintained. According to physics, if the CoG passes the vertical through the axle 15 such that the CoG is forward of the axle 15, then the wheelbarrow 10 tends to tip over forwardly as a result of forward moment forces particularly during forward unloading.

In typical wheelbarrows, forward unloading requires a strong and well controlled pushing force by the operator to shift the CoG over the wheel pivot, then a pulling force to counterbalance the created tipping over moment force. In the wheelbarrow 10 of this embodiment, the position of the wheel relative to the CoG and the forward load above an upper portion 34 of the container 11 allows the load to pivot through the wheel in the motion of unloading rather than lift over the wheel 14, significantly reducing the force required to lift the container 11 to the point of unloading, and also lowering the vertical lift required to commence discharge of the container 11. Additionally, while unloading, the moment force is substantially ameliorated by the use of two different levels provided by the upper portion 34 and a lower portion 35 within the container 11, the upper portion 34 and the lower portion 35 being connected by a shoulder 36 are created within the container 11. The CoG axis 37 is located at a position which is lower than the upper portion 34 and is also located slightly behind the axle 15 within the area defined by the lower portion 35. As the handle bars 23 are raised and the wheelbarrow 10 is lifted, the CoG axis 37 moves toward the axle 15 while it slowly empties its content. By the time the CoG axis 37 reaches the axle 15 and passes it, the actual load is minimal so that the generated moment force is negligible and does not require a strong counterbalancing force by the operator.

By way of example a second wheel 14' in FIG. 3 illustrates the location (exaggerated for demonstration) of a wheel as used in some conventional wheelbarrows to contrast the easy operation of the wheelbarrow 10 with conventional wheelbarrows. As can be seen, the wheelbarrow 10 comprises a container 11 with a pair of legs 17 extending downwardly therefrom and a front wheel 14'. As can also be seen, the CoG axis 37 of the wheelbarrow 10 is located rearward with respect to the front axle 15. It is assumed that the container 11 of the present invention could be releasably mounted on the frame 20. For ease of calculation the same container 11 as is used in this example embodiment is used on the conventional wheelbarrow.

The wheelbarrow 10 is in it's at stationary position with the legs 17 and front wheel 14' stationary on the ground in a generally horizontal orientation. Similarly the wheelbarrow 10 would be in its stationary position with the legs 17 and wheel 14 stationary on the ground in a generally horizontal orientation.

For the wheelbarrow 10 with a wheel 14 and a CoG axis 37, when the physics lever equation is used, the lifting force is calculated as follows:

$$LF = \frac{W \times L2}{L1 - L2}$$

Where: LF is the required lifting force,

L1 is the distance measured from the handle grip 24 (or operator's feet) on the handle bars 23 to the axle 15, L2 is the distance measured from the CoG axis 37 to the axle 15, and W is the actual payload of the loaded wheelbarrow 10. For the example embodiments, W−1000N, L1=1.0 m, L2=0.2 m LF=250N.

For the conventional wheelbarrow with wheel 14' and CoG axis 37, when the physics lever equation is used, the lifting force is calculated as follows:

$$LF = \frac{W \times L3}{L3 - L4}$$

Where: LF is the required lifting force,

L3 is the distance measured from the handle grip 24 (or operator's feet) on the handle bars 23 to the axle 15', L4 is the distance measured from the CoG axis 37 to the axle 15', and W is the actual payload of the loaded wheelbarrow.

For a conventional barrow W=1000N, L3=1.5 m, L2=0.75 m LF=1000N. As can be seen the lifting force required of the present embodiment for the wheelbarrow 10 is four times less than the lifting force required to lift a conventional wheelbarrow. Therefore the lifting force which is continuously exerted on the operator's wrists and legs is four times less when using the wheelbarrow 10 designed in accordance with the present invention. As can be appreciated these measurements are only approximate and it will be appreciated that the lifting force of the present invention could be far less as the CoG axis 37 moves closer to the axle 15 when the wheelbarrow 10 is lifted.

FIGS. 7 to 12 show the container 11 with a front section 30, a rear section or wall 31 joined by side walls 32 and joined at the bottom by the floor 33. The floor consists of the upper portion 34, the lower portion 35 and are joined by the shoulder portion 36. The floor 33 also consists of a joining portion or lip 40 which joins the floor 33 of the container 11 to the rear wall 31.

Figure 11:
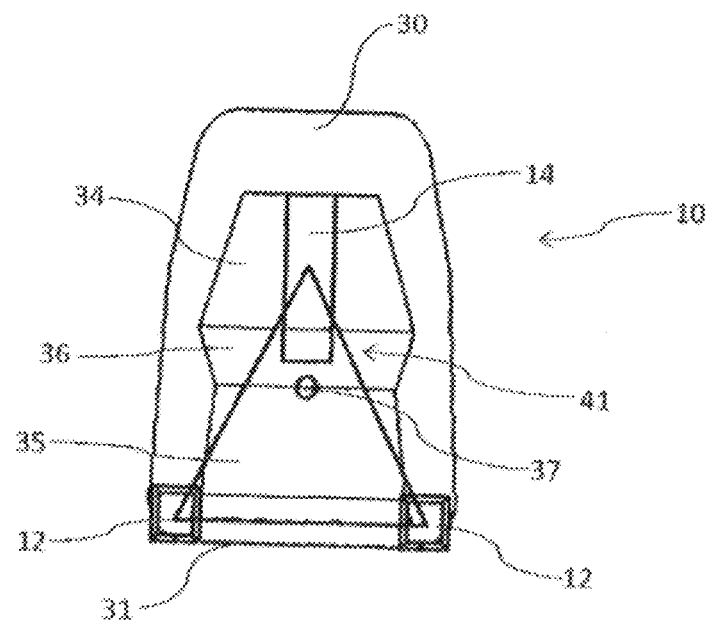
FIG. 11 is a schematic view illustrating the stability triangle of the wheelbarrow of FIG. 1 in the stationary position.
Figure 12:
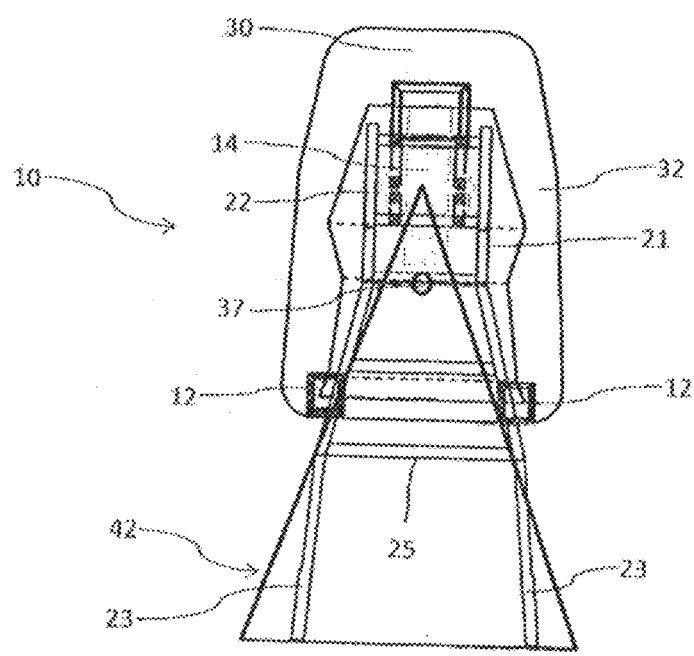
FIG. 12 is a schematic view illustrating the stability triangle of the wheelbarrow of FIG. 1 in a forward tilted or mobile position.

Turning now to FIGS. 11 and 12, there are schematic illustrations showing the wheelbarrow 10 in accordance with an embodiment of the present invention in an at stationary position (FIG. 11) and showing the corresponding area of stability triangle 41 for the at stationary position, and schematic illustration showing the wheelbarrow 10 in a raised or mobile position (FIG. 12) and the corresponding area of stability triangle 42 for that mobile position. The stability triangle 41 is defined by the point of contact of the wheel 14 with the ground and the points of contact of the legs 17 with the ground. Likewise the stability triangle 42 is defined by the point of contact of the wheel 14 with the ground and the operator's legs during lifting and forward movement, According to physics, as long as the CoG axis 37 is vertically projected within the triangle of stability 41/42, the wheelbarrow 10 remains stable and is not prone to tipping over. In the stationary position the CoG axis 37 is well within the stability triangle 41, as shown in FIG. 11. Likewise in the raised and mobile position the CoG axis 37 is well within the stability triangle 42 as shown in FIG. 12.

Figure 13:
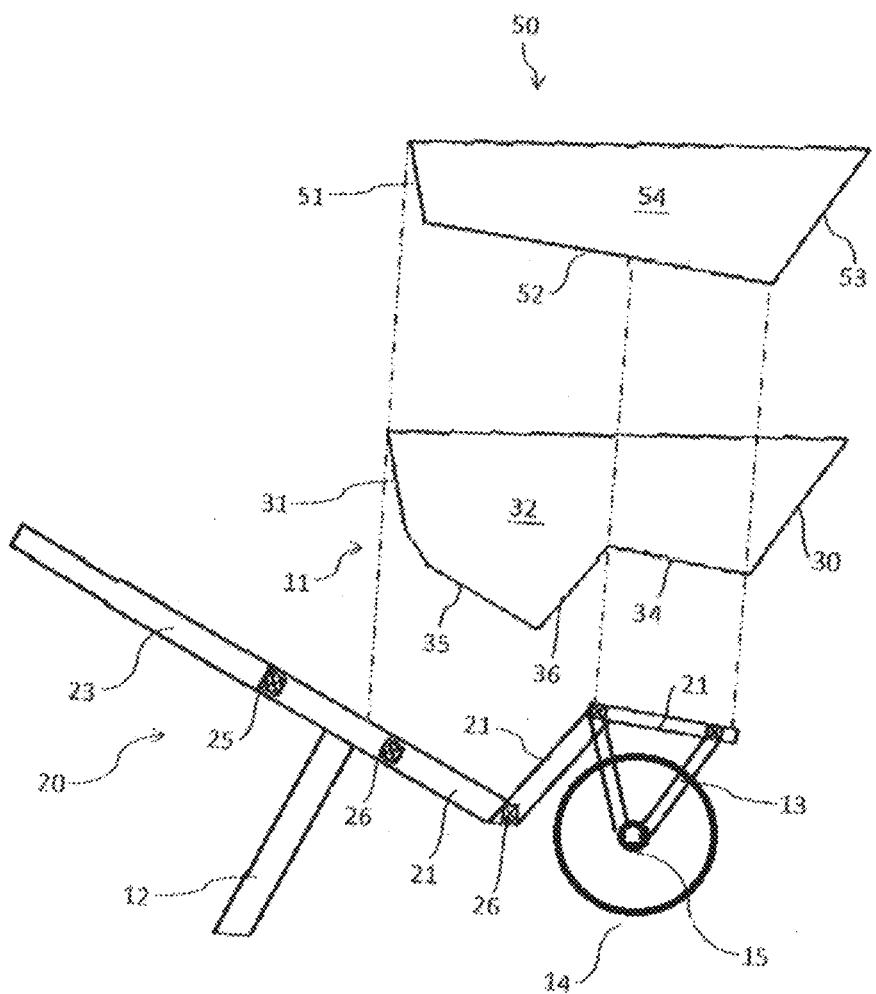
FIG. 13 shows a side view of the wheelbarrow of FIG. 6 with the load carrying container of FIGS. 7 to 10 and a further load carrying container used in accordance with a second embodiment of the present invention.

FIG. 13 illustrates a wheelbarrow according to a second embodiment of the present invention wherein the wheelbarrow 10 has a different container 50 fitted to the frame 20, wherein the container has a continuous flat floor 52.

The container 50 may be removably secured or permanently attached to the frame 20 in any suitable manner, such as bolts or the like (not shown), and it is preferable to provide spaced brace members 25, 26 for rigidity and strength. The container 50 with a front section 53, a rear section or wall 51 joined by side walls 54 and joined at the bottom by the floor 52.

The load carrying portion or container 11, 50 is either fabricated from a thin sheet metal sufficiently strong enough for use as a wheelbarrow or is molded from a reinforced plastic material sufficiently strong enough for use as a wheelbarrow for transporting materials from one place to another.

The CoG axis 37 is further maintained in the stability triangles 41, 42 by the use of the two different levels provided by the upper portion 34 and the lower portion 35 within the container 11. The upper portion 34 and the lower portion 35 separated by the shoulder 36 strategically place the CoG axis 37 behind the axle 15 in the lower portion 35 and subsequently due to the position of the CoG axis 37 at the lower level aids to maintain the CoG axis 37 within the stability triangles 41, 42 at all times.

In an example where the lower portion 35 is subject to loading first, the CoG axis 37 is maintained within the stability triangle therefore allowing a stable balancing weight on initial loading. This design feature allows greater stability at initial loading of the container 11 compared to conventional wheelbarrows which can tend to load eccentrically outside the stability triangle 41/42 and overturn the container.

In operation, the wheelbarrow 10 is operable in a "stationary" mode, wherein it is positioned substantially as shown in FIG. 1, with the base portions of each leg 17 of the support assembly 12 and the wheel 14 substantially aligned and engaged with a support surface, such as the ground, floor, or the like. In the stationary mode, the wheelbarrow 10 may be loaded with stone, brick, dirt, or the like, or the same may be unloaded from the wheelbarrow. The wheelbarrow 10 is also operable in a "mobile" mode, wherein a person (not shown) may grip the handles 23 and lift the rear portion of the wheelbarrow 10, and then move the wheelbarrow as desired to a new location. When the new location is reached, the rear portion of the wheelbarrow 10 may be lowered and restored to a stationary mode or lifted further to unload the load over the front of the wheelbarrow. Because the operation of a wheelbarrow is considered to be well-known, its operation will not be described in further detail herein.

The nature of the lever arm means that the CoG when "mobile" actually moves closer to the pivotal axle, thus reducing the lifting load required when mobile compared to when it is stationary. This stated, the CoG still remains behind the pivot for stability and control.

Figure 14:
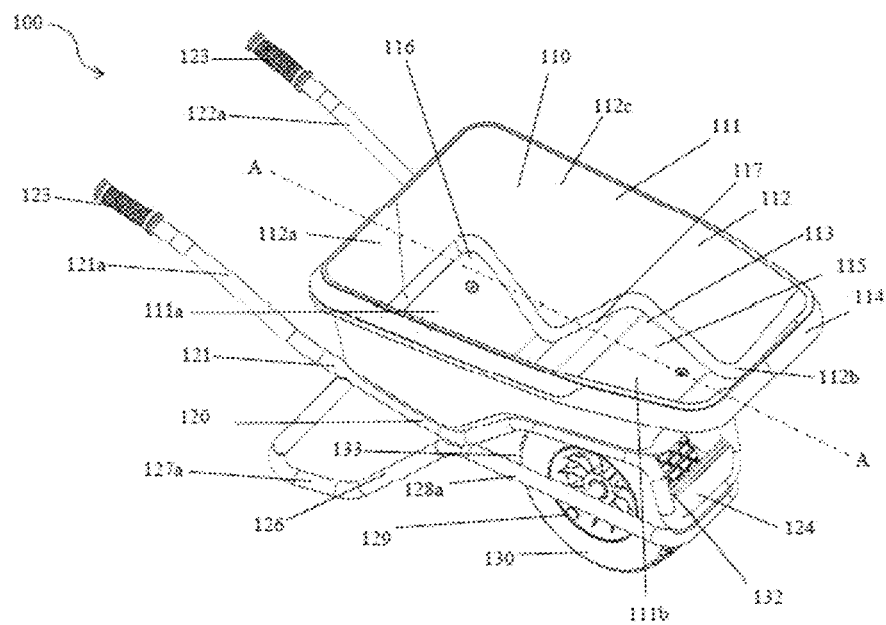
FIG. 14 is a perspective view from above of a wheelbarrow of a third embodiment of the present invention.
Figure 15:
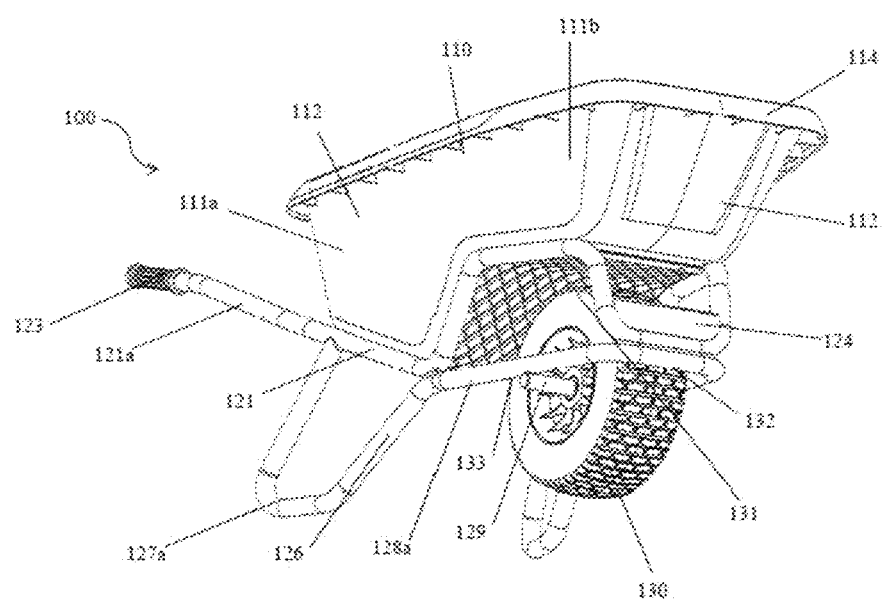
FIG. 15 is a perspective view from below of the wheelbarrow of FIG. 14.
Figure 16:
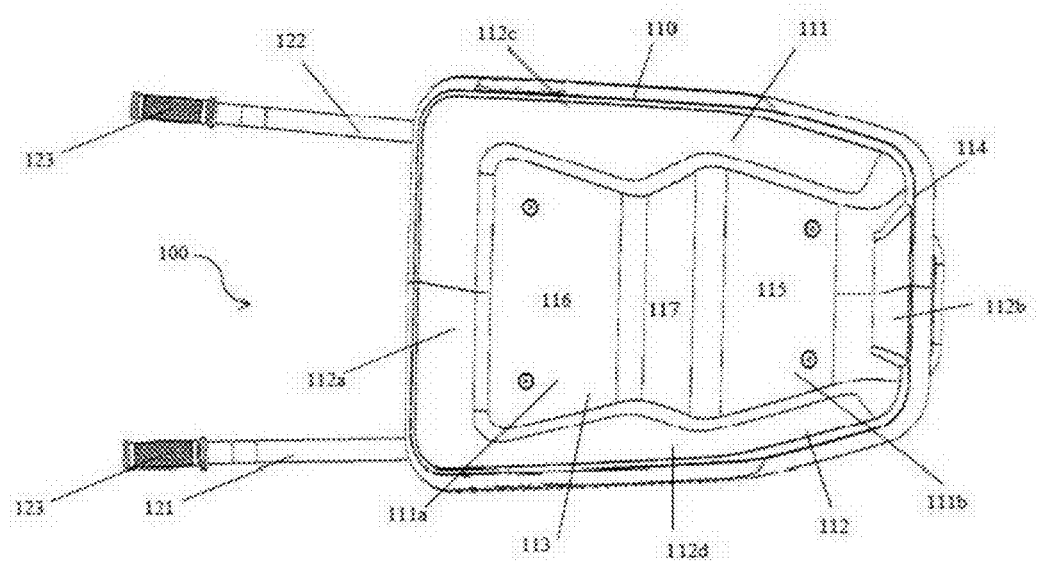
FIG. 16 is a plan view of the wheelbarrow of FIG. 14.

Referring to FIGS. 14 and 15 of the drawings, the reference numeral 100 generally designates a wheelbarrow according to a third example embodiment of the present invention. The wheelbarrow 100 includes a main frame 120 configured for supporting a container or open hollow body 110 (e.g., a tub, receptacle or tray). The wheelbarrow 100 further includes an axle 129 coupled or integral to the main frame 120 on which a wheel 130 are axially mounted for facilitating movement of the wheelbarrow by a person in a conventional manner. The container 110 may be removably secured or permanently attached to the frame 120 in any suitable manner, such as bolts, or the like (not shown).

The frame 120 includes a pair of spaced elongate arm members (hereinafter also referred to as arms) 121, 122 which extend generally longitudinally through the length of the wheelbarrow 100. The arms 121 and 122 extend along an underside of the container 110 to support the container thereon. Each arm extends at or near an edge or periphery on respective sides of the container 110. In other embodiments the arms 121, 122 may alternatively extend through a middle or intermediate section of the underside of the container 110. A length of each arm 121, 122 is shaped or formed to follow the general profile of the underside of the container 110 along at least a substantial or full length of the container to appropriately support the container 110 thereon. As shown, in the preferred embodiment, each arm 121, 122 is formed to have a substantially shallow serpentine shape along at least a portion of the length of the arm to accommodate the profile of the underside of the container 110.

The pair of spaced arm members 121, 122 are substantially disposed at angles with respect to each other diverging at a rear and open end of the frame where the arms 121, 122 are open/spaced from one another, and converge at an opposing front and closed end of the frame where the arms 121, 122 are proximate and In an example, connected to one another. At the open end, each arm extends laterally beyond the underside of the container 110 to allow handling of the wheelbarrow by a user. Each arm 121, 122 also extends at an upward acute angle relative to a general longitudinal axis 'A' of the wheelbarrow so that an end 121a/122a of each arm 121, 122 terminates at a height that reduces the effort required by the user to handle the wheelbarrow. At the open end of the frame each arm 121, 122 terminates in a handle or handle bar 123 comprising a handgrip, for example. The handles 123 are for facilitating the manipulation of the wheelbarrow 100. The handles 123 are angled acutely relative to the longitudinal axis A of the wheelbarrow 100 to improve comfort for the user and to reduce lifting force as is empirically shown in the lifting calculation section. Each arm at the open end 121a, 122a is angled between approximately 15° and 45° relative to the general longitudinal axis A of the wheelbarrow 100. The handles 123 may be angled shallower than the arms 121, 122 at ends 121a, 122a. The handgrips of the handles 123 comprise a material, such as rubber, nylon, or the like, that is effective for enabling a person to comfortably lift the rear end of wheelbarrow 100 in a conventional manner.

The frame 120 further comprises a support assembly 126 welded or otherwise secured to the elongate arm members 121, 122 for engaging the ground and supporting the wheelbarrow 100 in a rest or stationary position and assisting in maintaining the wheelbarrow 100 in position for appropriately containing the load therein in the stationary position. The support assembly 126 may be of any suitable type, and, in one example, comprises a pair of spaced leg members 127a, 127b, each extending transversely from the respective arm 121, 122 away from the container 110 and towards the ground, at or towards the rear end of the frame 120. Extending from each leg 127a, 127b of the support assembly 126 is an elongate axle support arm 128a, 128b. The elongate axle support arms 128a, 128b extend from the respective legs 127a, 127b in a direction substantially parallel to the longitudinal axis A, towards the axle 129 and terminate in a closed end where the support arms 128a, 128b are connected to one another.

In this embodiment, the support arms 128a, 128b are constructed as a single fabricated support member 128. The support arms 128a, 128b extend about/either side of the wheel 130 to support unencumbered rotation of the wheel 130 there between. The closed end of the support arms 128a, 128b at the front of the frame 120 protects the wheel 130 from damage. The closed end of the support arms 128a, 128b is connected to a wheel guard or protector 124 provided at a closed end of the elongate arms 121, 122 to protect the wheel 130. Elongate arms 121, 122 follow the profile of the container 110 above to form an arch shaped region supporting the shoulder and upper regions of the container to transfer the loads contained therein to the main frame and ground engaging wheel.

The wheel 130 is freely journalled on a pivot shaft or axle 129 in any suitable manner, such as by bearing supports (not shown). The axle 129 comprises a substantially straight central portion for rotatably supporting the wheel 130 thereon and is connected at both ends to the pair of parallel arms 128a and 128b of the support assembly 126. The axle 129 is secured to the parallel arms 128a and 128b by pillow blocks, or the like.

The container 110 comprises a hollow interior 111 bounded by an enclosing wall 112 and a floor 113. The wall 112 comprises front section 112b and an opposing rear section 112a, joined by two side sections 112c/d. An upper edge 114 of the wall 112 may be substantially level along its perimeter. The floor 113 consists of a substantially shallow serpentine profile along its longitudinal length to form a front, upper portion 115 which provides an upper level, and a rear, lower portion 116, which provides a lower level, joined by an intermediate shoulder portion 117. This structure of the floor 113 forms a front, upper hollow region 111b and a rear, lower hollow region 111a of the container 110. The upper region 111b is shallower than the deeper lower region 111a. The floor of the upper region 111b is substantially planar and is above the uppermost edge of the wheel 130 spanning across the entirety of its width (extending between either side section 112c/d). The upper hollow region 111b defines a volume, located above the uppermost edge of the wheel 130. When material is loaded into this volume the required lifting force for a loaded wheelbarrow 100 is greatly reduced when compared to conventional wheelbarrows, while still maintaining a degree of stability.

The volume defined by the upper hollow region 111b is within 10-50% of the entire volume of the hollow container 110. Furthermore, approximately 5-30% of the volume of the container may be in front of the axle 129. The shoulder portion 117 is angled or ramped between the upper portion 115 and lower portion 116 of the floor 113. In alternative embodiments, the shoulder 117 may be stepped, curved or substantially vertical.

The front upper hollow region 111b comprises a portion positioned in front of and/or at an outer side of the wheel axle 129 and a portion positioned behind and/or at an inner side of the wheel axle 129 in the longitudinal direction of the wheelbarrow 100. Once loaded, the front portion of the upper region 111b reduces the tilt torque or force required to unload the contents of the container 110. The front wall section 112b and therefore the upper hollow region 111b extend beyond the outermost edge 132 of the wheel 130 in the longitudinal direction to further reduce the tilting torque/force required to unload the container 110. This region is also located above the uppermost edge 131 of the wheel 130 to provide clearance from the ground during forward tilting and increase the rotatable range of the wheelbarrow 100 in motion. The rear lower region 111a is located behind the innermost edge 133 of the wheel 130 in the longitudinal direction to enhance and/or ensure stability of the wheelbarrow 100 during rest/when stationary and motion.

Figure 17:
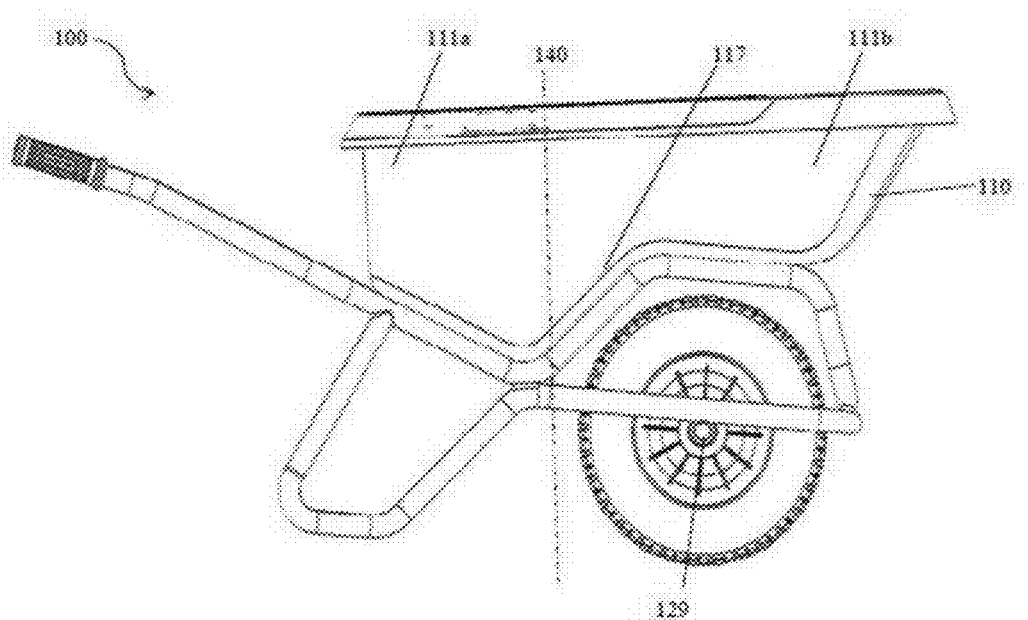
FIG. 17 is a side view of the wheelbarrow of FIG. 14 in the stationary position.
Figure 18:
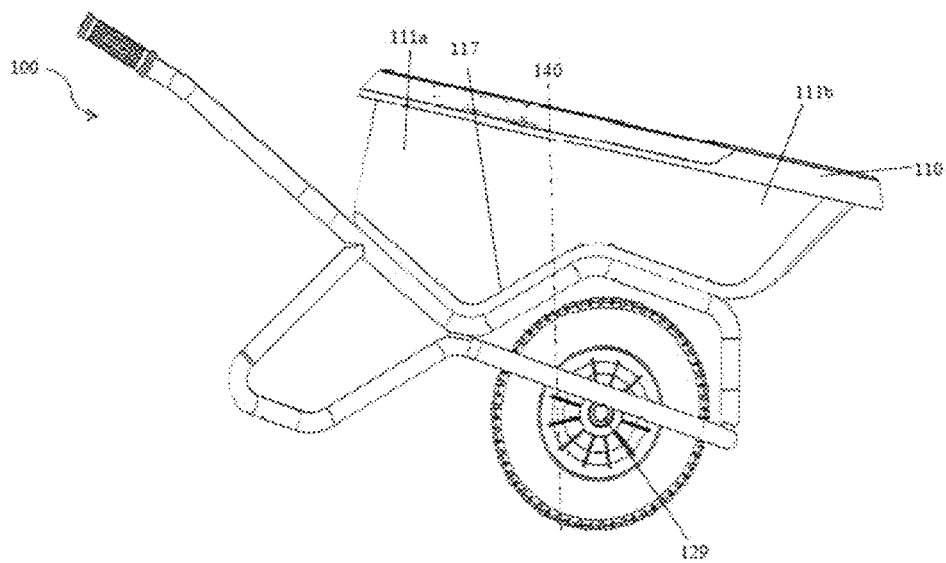
FIG. 18 is a side view of the wheelbarrow of FIG. 14 in the mobile position.
Figure 19:
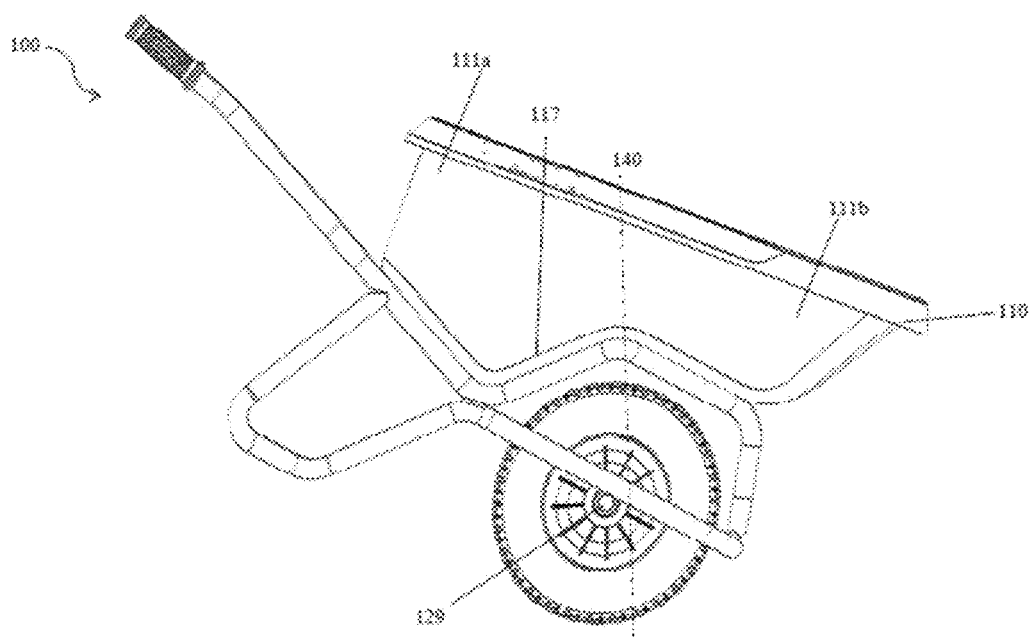
FIG. 19 is a side view of the wheelbarrow of FIG. 14 in a forward titled or mobile position.

The principles of operation of the wheelbarrow according to the present embodiment may be better understood with reference to FIGS. 17 to 19. FIG. 17 shows a side view of the wheelbarrow 100 of the third embodiment when stationary to depict the longitudinal displacement of the center of gravity (CoG), and more precisely an axis extending substantially orthogonal to the longitudinal axis of the wheelbarrow 100 through the CoG (herein after referred to as CoG axis 140), of the load with respect to the wheel axle 129. This represents a significant reduction in the distance of the effective lever arm between the center of the load to the center of the ground engaging wheel 130 or axle 129. It will be appreciated that as the wheelbarrow 100 is lifted, the CoG axis 140 moves forward and nearer the vertical through the wheel axle 129, thus decreasing the lever arm distance between the CoG axis 140 and the wheel axle 129. However, the CoG 140 still remains rearward with respect to the wheel axle 129 so that stability is maintained.

In this manner, as the wheelbarrow 100 is lifted, the leverage experienced by the user moves from a second class type lever towards a first class type lever. According to physics, if the CoG passes the vertical through the axle 129 such that the CoG axis 140 is forward of the axle 129, then the wheelbarrow 100 tends to tip over forwardly as a result of forward moment forces and this is experienced particularly during forward unloading as shown in FIG. 19.

In conventional wheelbarrows, forward unloading requires a strong and well controlled pushing force by the operator to shift the center of load or CoG axis over the wheel pivot, then a pulling force to counterbalance the created tipping over moment force. In the wheelbarrow 100, the position of the wheel 130 and axle 129 relative to the CoG axis 140, and the position and volume of the upper region 111b of the container 110 relative to the wheel pivot, allows the load to pivot through the wheel in the motion of unloading rather than lift over the wheel 130, significantly reducing the force required to lift the container 110 initially from the stationary position (FIG. 17) to the mobile position (FIG. 18), and subsequently from mobile to the unloading position (FIG. 19). The vertical lift required to commence discharge of the container 110 is thus lowered in this manner as the leverage experienced by the user changes from a second class type lever to a first class type lever.

Additionally, while unloading, the moment force is substantially ameliorated by the use of upper region 111b and lower region 111a. The CoG axis 140 extends through a position which is lower than the upper region 111b and is in an example may be also located slightly behind the wheel axle 129 in the stationary and mobile positions, within the area defined by the shoulder 117. The wheelbarrow container 110 is shaped and configured to distribute load such that the CoG or CoG axis 140 of the wheelbarrow 100, in at least the stationary and mobile positions, remains positioned within the shoulder portion 117 of the floor 113 of the container 110, or remains within 100 to 250 mm behind the axle 129 of the wheelbarrow. As the handle bars 123 are raised and the wheelbarrow 100 is tilted, the CoG axis 140 moves toward the wheel axle 129 while it slowly empties its content. By the time the CoG axis 140 reaches the axle 129 and passes it, the actual load is minimal so that the generated moment force required to unload the remaining load is negligible and does not require a strong counterbalancing force by the operator.

Figure 20:
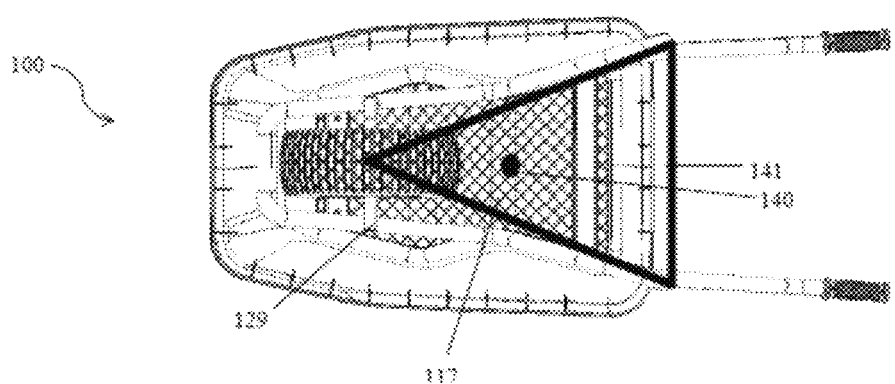
FIG. 20 is an underside view illustrating the stability triangle of the wheelbarrow of FIG. 14 in the stationary position.
Figure 21:
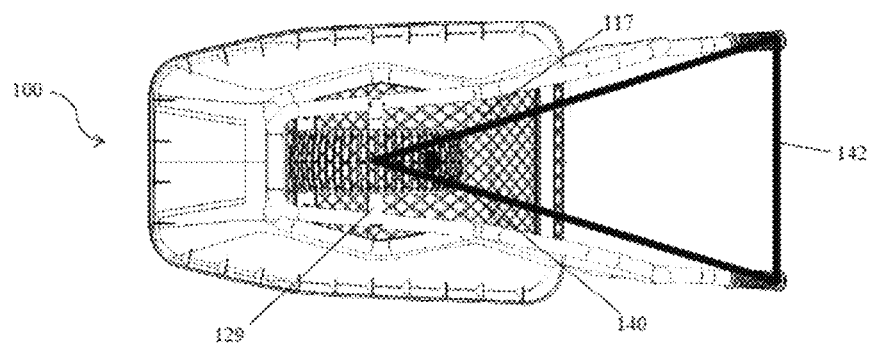
FIG. 21 is an underside view illustrating the stability triangle of the wheelbarrow of FIG. 14 in a forward tilted or mobile position.

Turning now to FIGS. 20 and 21, there are schematic illustrations showing the wheelbarrow 100 in accordance with an embodiment of the present invention in a stationary position (FIG. 20) and showing the corresponding area of stability triangle 141 for the stationary position and schematic illustration showing the wheelbarrow 100 in a raised or mobile position (FIG. 21) and the corresponding area of stability triangle 142 for that moving position. The stability triangle 141 is defined by the point of contact of the front wheel 130 with the ground and the points of contact of the legs 127a/b with the ground. Likewise the stability triangle 142 is defined by the point of contact of the front wheel 130 with the ground and the operator's legs during lifting and forward movement.

According to physics, as long as the CoG axis 140 is vertically projected within the triangle of stability 141 and 142, the wheelbarrow 100 remains stable and it does not tip over. In the stationary position the CoG axis 140 is well within the stability triangle 141 shown in FIG. 20. Likewise in the raised and mobile position the CoG axis 140 is well within the stability triangle 142 shown in FIG. 21. The CoG axis 140 is further maintained in the stability triangles 141, 142 by the use of the two levels of the upper portion 115 and the lower portion 116 of the container 110. The upper region 111b and the lower region 111a, separated by the shoulder 117, strategically place the CoG axis 140 behind the wheel axle 129 in or adjacent the lower region 111a and subsequently, due to this positioning, the CoG axis 140 is maintained within the stability triangles 141, 142 during at least stationary and mobile positions of the wheelbarrow 100.

It is also noted that when the lower region 111a is loaded first, the CoG 140 is maintained within the stability triangle 141/142, therefore allowing a stable balancing weight on initial loading. This design feature allows greater stability at initial loading of the container compared to conventional barrows which can tend to load eccentrically outside the stability triangle and overturn the container.

In some embodiments, the wheelbarrow 100 may comprise a container 110 with a substantially planar or single level floor 113 positioned entirely above the wheel 130. The container 110 may be removably secured or permanently attached to the frame 120 in any suitable manner, such as bolts, or the like (not shown).

The load carrying portion or container 110 may be either fabricated from a thin sheet metal sufficiently strong enough for use as a wheelbarrow, or is molded from a reinforced plastic material sufficiently strong enough for use as a wheelbarrow for transporting materials from one place to another.

In operation, the wheelbarrow 100 of this third embodiment is operable in a "stationary" mode, wherein it is positioned substantially as shown in FIG. 14, with the base or leg portions 127a and 127b and the wheel 130 substantially aligned and engaged with a support surface, such as the ground, floor, or the like. In the stationary mode, the wheelbarrow 100 may be loaded with stone, brick, dirt, or the like, or the same may be unloaded from the wheelbarrow. The wheelbarrow 100 is also operable in a "mobile" mode, wherein a person (not shown) may grip the handles 123 and lift the rear portion and legs 127a/127b off the ground, and then move the wheelbarrow 100 as desired to a new location. When the new location is reached, the rear portion of the wheelbarrow 100 may be lowered and restored to a stationary mode or lifted further to unload the load over the front of the wheelbarrow. Because the operation of a wheelbarrow is considered to be well-known, its operation will not be described in further detail herein.

The nature of the lever arm means that the CoG when "mobile" actually moves closer to the pivotal axle, thus reducing the lifting load required when mobile compared to when it is stationary. The CoG still remains behind the pivot for stability and control.

Lifting Calculations

Figure 22:
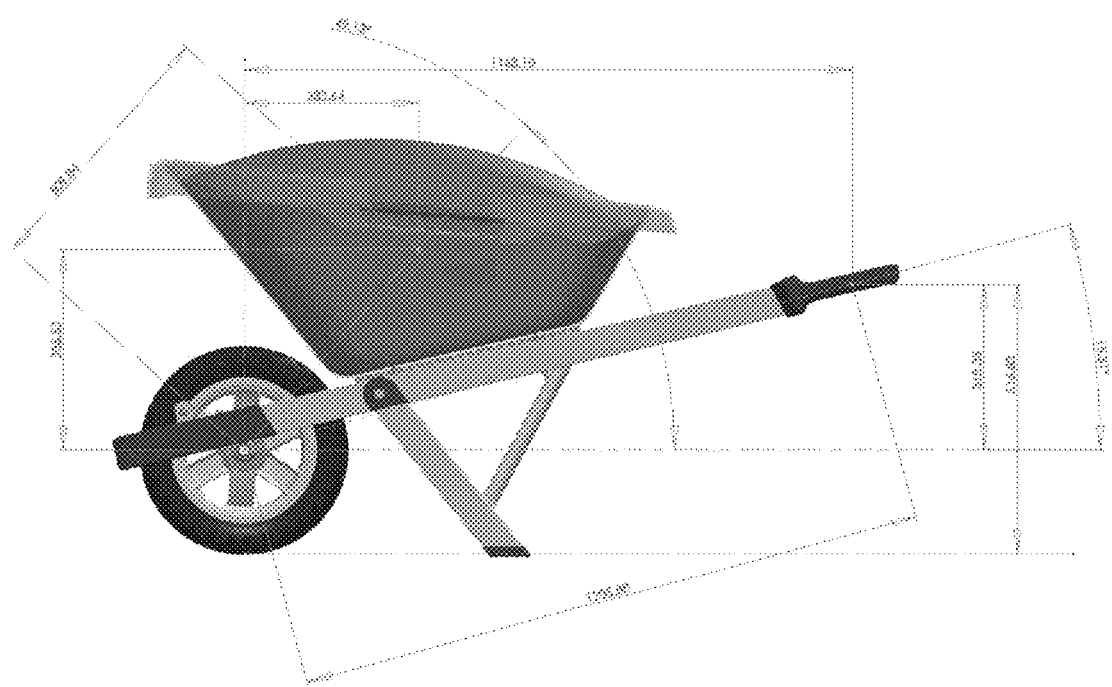
FIG. 22 is a lifting calculation diagram for a conventional wheelbarrow.
Figure 23:
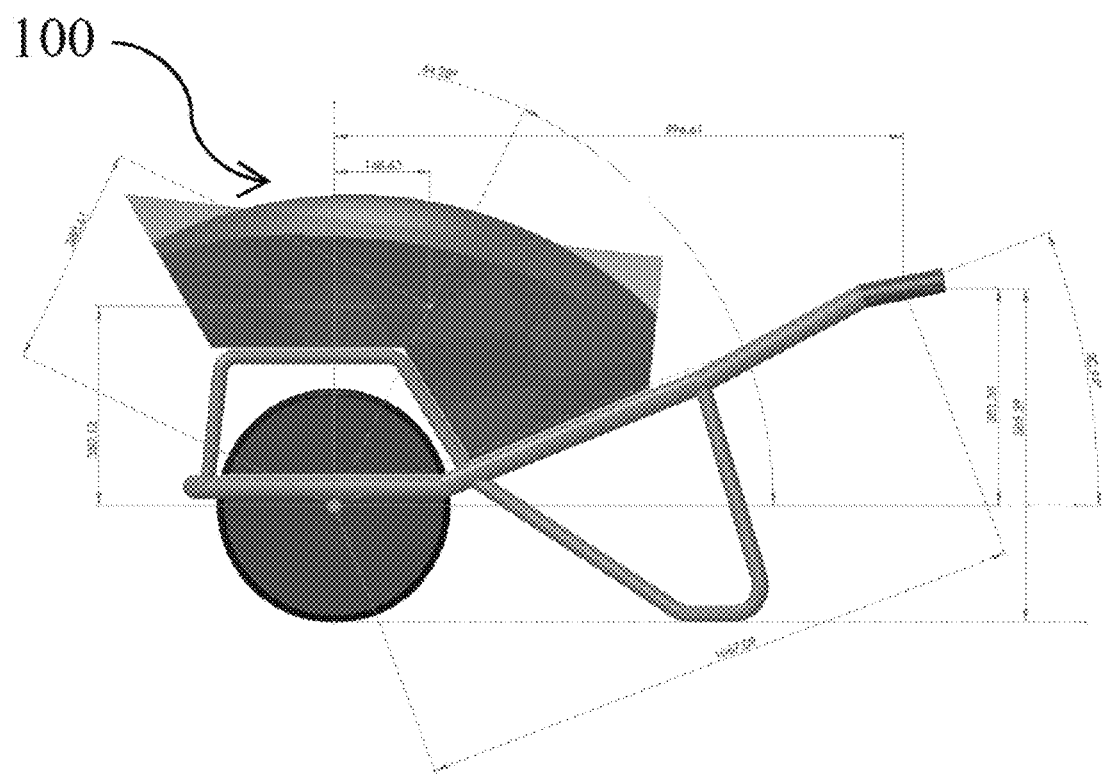
FIG. 23 is a lifting calculation diagram for the wheelbarrow of FIG. 14.

Referring to FIGS. 22 and 23, the improvements in lifting force provided by the wheelbarrow 100 relative to a conventional wheelbarrow of a same or similar volume will now be empirically described. The calculations provided are for wheelbarrows having a container volume of approximately 110 liters and a weighted load of approximately 220 kg (for example wet sand with density of 2000 kg/m³). It will be appreciated that the dimensions provided here onwards are only exemplary for describing the improvements in lifting force provided by the structure of the wheelbarrow 100 over conventional wheelbarrows. Table 1 shows the parameters that will be used in the following equations.

TABLE 1

Parameters for calculating lift force.

| Start Parameter | Symbol [Unit] | Standard Wheelbarrow | Example Embodiment |
|---|---|---|---|
| Angle load | $\alpha_{0l}$ [deg] | 49.13000 | 64.28000 |
| Angle handle | $\alpha_{0h}$ [deg] | 15.31000 | 20.95000 |
| Height load | $b_{0l}$ [m] | 0.38553 | 0.35012 |
| Height handle | $b_{0h}$ [m] | 0.31835 | 0.38139 |
| Lever load | $l_{0l}$ [m] | 0.33640 | 0.16863 |
| Lever handle | $l_{0h}$ [m] | 1.16310 | 0.99661 |
| Distance load | $c_l$ [m] | 0.50986 | 0.38861 |
| Distance handle | $c_h$ [m] | 1.20588 | 1.06709 |
| Load | $F_l$ [N] | 2200 | 2200 |

The following equations can be used for calculating lift force:

$b_\Delta$ = Lift of f the ground at handle $$b_h = b_{0h} + b_\Delta$$

$$\alpha_\Delta = \sin^{-1}\left(\frac{b_h}{c_h}\right)$$

$$\alpha_x = \alpha_0 + \alpha_\Delta$$

$$l_l = \cos \alpha_l \times c_l$$

$$l_h = \cos \alpha_h \times c_h$$

$$F_h = \frac{(F_l \times l_l)}{l_h}$$

$$\text{Lifting force[kg]} = \frac{F_h}{10}$$

$$\text{Lifting force[kg]} = \frac{\left(F_l \cos\left(\alpha_{0l} + \left(\left(\sin^{-1}\left(\frac{b_{0h} + b_h}{c_h}\right)\right) - \alpha_{0h}\right)\right)c_l\right) \Big/ \left(\left(\cos\left(\alpha_{0h} + \left(\sin^{-1}\left(\frac{b_{0h} + b_\Delta}{c_h}\right)\right)\right) - \alpha_{0h}\right)c_h\right)}{10}$$

For a static lift force off the ground, the lifting force is:

$$F_h = \frac{(F_l \times l_l)}{l_h}$$

For a conventional wheelbarrow the static lift force off the ground is:

$$F_h = \frac{(2200 \text{ N} \times 0.333 \text{ m})}{1.163 \text{ m}} = 630 \text{ N} = 63 \text{ kg lifting weight}$$

For the wheelbarrow 100 of the third embodiment the static lift force off the ground is:

$$F_h = \frac{(2200 \text{ N} \times 0.169 \text{ m})}{0.997 \text{ m}} = 373 \text{ N} = 37 \text{ kg lifting weight}$$

Thus a 41% reduction in lift force is provided to the user by wheelbarrow 100 over conventional wheelbarrows.

Lifting force is dependent on lifting height. For a conventional wheelbarrow the static lifting force at 10 cm off the ground is:

$$\Delta\alpha_{10}=+5.0°=>l_{f10}=0.300 \text{ m}=>l_{h10}=1.133 \text{ m}$$

$$F_{h10} = \frac{(F_l \times l_{h10})}{l_{h10}} = \frac{(2200 \text{ N} \times 0.300 \text{ m})}{1.133 \text{ m}} = 582.5 \text{ N} = 58.1 \text{ kg lifting weight}$$

For the wheelbarrow 100 of the third embodiment the static lifting force at 10 cm off the ground is:

$$\Delta\alpha_{10}=+5.8°=>l_{f10}=0.132 \text{ m}=>l_{h10}=0.952 \text{ m}$$

$$F_{h10} = \frac{(F_l \times l_{h10})}{l_{h10}} = \frac{(2200 \text{ N} \times 0.132 \text{ m})}{0.952 \text{ m}} = 305.0 \text{ N} = 30.5 \text{ kg lifting weight}$$

Thus, a 47.5% reduction in lifting force at 10 cm off the ground is provided by the wheelbarrow 100 over a conventional wheelbarrow.

Figure 24:
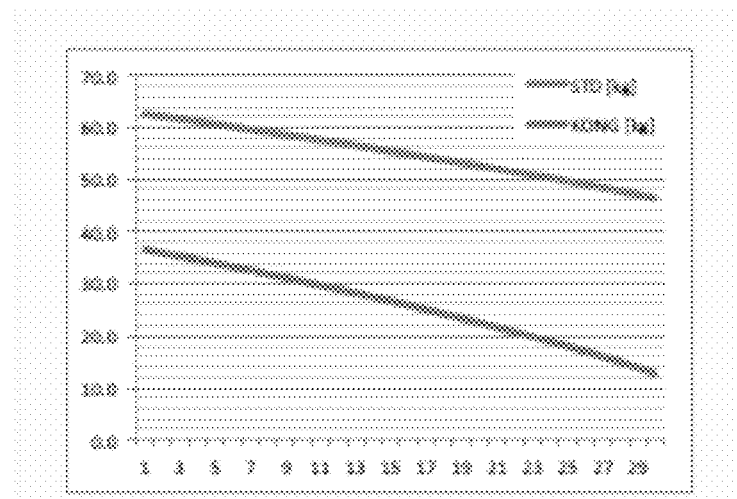
FIG. 24 is a graph showing the changes in lifting force, (expressed as a weight along the y-axis) at different lift positions (expressed in centimeters as the height above the ground along the x-axis) for a conventional wheelbarrow (STD) and the wheelbarrow of FIG. 14 (KONG).
Figure 25:
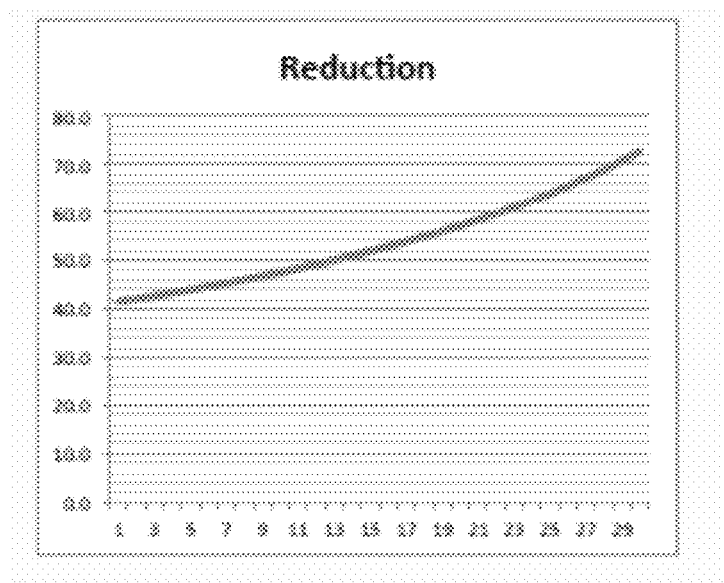
FIG. 25 is a graph showing the reduction in lifting force (expressed as a percentage effective saving of weight force upon lifting along the y-axis) between a conventional wheelbarrow and the wheelbarrow of FIG. 14 at different lifting positions (expressed in centimeters as the height above the ground along the x-axis).

Table 2 shows the lifting forces at various lift heights off the ground for conventional wheelbarrows and the wheelbarrow 100 of the third embodiment. The table also shows the percentage reduction in lift force for each height. These are plotted in the diagrams of FIGS. 24 and 25.

As is shown, the wheelbarrow 100 does not just provide a significant reduction in lift force at various lift heights, but the percentage of reduction relative to a conventional wheelbarrow increases as the lift height increases. This is due to the shifting of the load and the center of gravity axis towards the upper region 111b of the container 110 and significantly reducing the lever arm distance as described above.

TABLE 2

Lifting force vs. lift height for standard and preferred form wheelbarrows.

| Lift [cm] | Lifting Force STD [kg] | Example Form Wheelbarrow [kg] | Reduction [%] |
|---|---|---|---|
| 1 | 62.6 | 36.6 | 41.6 |
| 2 | 62.1 | 36.0 | 42.1 |
| 3 | 61.7 | 35.3 | 42.7 |
| 4 | 61.2 | 34.6 | 43.4 |
| 5 | 60.7 | 34.0 | 44.0 |
| 6 | 60.2 | 33.3 | 44.7 |
| 7 | 59.7 | 32.6 | 45.3 |
| 8 | 59.2 | 31.9 | 46.0 |
| 9 | 58.6 | 31.2 | 46.8 |
| 10 | 58.1 | 30.5 | 47.5 |
| 11 | 57.6 | 29.8 | 48.3 |
| 12 | 57.1 | 29.0 | 49.2 |
| 13 | 56.5 | 28.3 | 50.0 |
| 14 | 56.0 | 27.5 | 50.9 |
| 15 | 55.5 | 26.7 | 51.8 |
| 16 | 54.9 | 25.9 | 52.8 |
| 17 | 54.3 | 25.1 | 53.8 |
| 18 | 53.8 | 24.3 | 54.9 |
| 19 | 53.2 | 23.4 | 56.0 |
| 20 | 52.6 | 22.6 | 57.1 |
| 21 | 52.0 | 21.7 | 58.4 |
| 22 | 51.4 | 20.8 | 59.6 |
| 23 | 50.8 | 19.8 | 61.0 |
| 24 | 50.2 | 18.9 | 62.4 |
| 25 | 49.6 | 17.9 | 63.9 |
| 26 | 49.0 | 16.9 | 65.4 |
| 27 | 48.3 | 15.9 | 67.1 |
| 28 | 47.7 | 14.9 | 68.8 |
| 29 | 47.0 | 13.8 | 70.7 |
| 30 | 46.4 | 12.7 | 72.7 |

ADVANTAGES

In use, the example wheelbarrows 10/100 may be loaded with any desired materials, such as sand, dirt, or the like, and may be lifted by the handles 23/123 in the usual manner whereby the wheel 14/140 may roll across the surface of the ground for transporting the materials from site to site. The balance of the load in the container 11/110 provides extreme ease of movement for the wheelbarrow 10/100 and the design of the container 11/110 compensates for any imbalance of the load carried in the container 11/110. The turning of the loaded wheelbarrow 10/100 is easily accomplished due to the low center of gravity of the load located in the wheelbarrow 10/100, and it is found that loads of considerable weight may be easily handled by persons of relatively small stature.

The example embodiments employ the intelligent positioning of the CoG and the change in the lever arm within the lower section of the container 11/110 and by utilizing principles of physics combined with three-dimensional shapes to define a self-stabilizing and self-balancing multi-purpose wheelbarrow 10/100 for different loading conditions and operated with minimal controlling forces.

The wheelbarrow design described herein thus reduces operator susceptibility to injury, increases the effective user demographic by reducing the effective load, increases load capacity, reduces task rotation and increase long term productivity of task completion.

Variations

Those skilled in the art will appreciate that the above description and recitations are intended to serve only as examples to illustrate the merits of the wheelbarrow 10/100 and that these principles and concepts can be utilized in a variety of embodiments which may vary but are considered to be within the scope of the present invention. In one example, the example embodiments may be applicable but not limited to connection to various devices, structures and articles.

In another example in one embodiment, the floor 113 at the upper region 111b of the container 110 may be substantially planar and is above the uppermost edge of the wheel 130 along a substantial portion and, in an example, the entirety of its width (extending between either side section 112c/d). In other embodiments, the floor 113 may not necessarily be a planar surface and may comprise a three-dimensional profile having a substantial portion or an entire portion of the floor 113 above the wheel 130. The portion of the floor 113 positioned above the wheel 130 may be sufficient to form a upper hollow region 111b that comprises a volume, located above the uppermost edge of the wheel 130, sufficient to significantly reduce or minimize the lifting force of a loaded wheelbarrow 100 whilst still maintaining a certain degree of stability.

Also, in an embodiment the upper hollow region 111b comprises a volume approximately 10-50% of the entire volume of the hollow container 110. In an alternative, the upper hollow region 111b may comprise a volume that is approximately 15-40% of the entire volume of the hollow container 110. In a further example, the upper hollow region 111b may comprise a volume that is approximately 20-30% of the entire volume of the hollow container 110. In an embodiment, the upper hollow region 111b comprises a substantial volume in front of the axle 129, where approximately 5-30% of volume of the container may be in front of the axle 129, 10-25% in another example, and 15-20% in a further example.

The present invention, in its various embodiments, configurations, and aspects, includes components, systems and/or apparatuses substantially as depicted and described herein, including various embodiments, sub-combinations, and subsets thereof. Those of skill in the art will understand how to make and use the present invention after understanding the present disclosure. The present invention, in its various embodiments, configurations, and aspects, includes providing devices in the absence of items not depicted and/or described herein or in various embodiments, configurations, or aspects hereof, including in the absence of such items as may have been used in previous devices, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures to those claimed, whether or not such alternate, interchangeable and/or equivalent structures disclosed herein, and without intending to publicly dedicate any patentable subject matter.

We claim:

1. A wheelbarrow for carrying materials, comprising:
a main frame defining first and second spaced-apart longitudinal portions,
a load carrying portion comprising a front wall and a rear wall adjoined by first and second side walls and a floor defining a receptacle, wherein the first side wall is opposite the second side wall, the load carrying portion being mounted to the main frame and configured for supporting the materials,
an axle mounted below the main frame and contained substantially within the first and second spaced apart longitudinal portions,
a ground engaging wheel rotatably mounted on the axle for moving the wheelbarrow over the ground, and
a first leg structure and a second leg structure attached respectively to the first and second spaced apart longitudinal portions configured to engage the ground when the wheelbarrow is in a stationary position,
wherein the load carrying portion has an upper portion and a lower portion separated by a shoulder that extends from the first side wall to the second side wall, the upper portion located above the ground engaging wheel and the lower portion located behind the wheel, wherein a distribution of load achieved by the upper portion, lower portion, and shoulder forms a center of gravity disposed behind the axle in the lower portion when the wheelbarrow is at rest.

2. The wheelbarrow of claim 1, wherein the main frame, the first leg structure, and the second leg structure are fabricated from tubular steel.

3. The wheelbarrow of claim 1, wherein the center of gravity of the wheelbarrow when at rest is located proximate the shoulder so that the center of gravity is located in close proximity to the wheel.

4. The wheelbarrow of claim 1, wherein the wheel is mounted on a support frame comprising elongate members extending from the main frame and located on either side of the axle.

5. The wheelbarrow of claim 1, wherein the front wall of the load carrying portion is inclined forwardly-upwardly towards a front edge thereof.

6. A wheelbarrow, comprising,
a frame formed from a first longitudinally extending body and a second identical longitudinally extending body with at least one pivot mounted wheel extending from the frame and a pair of handle bars and grips extending rearward from the first and second longitudinally extending bodies,
at least two support members extending from the frame upon which the wheelbarrow is supported when in the rest position, and at least one laterally extending element extending between and spacing apart the first and second longitudinally extending bodies, and
a load carrying body comprising a front and rear wall adjoined by opposite side walls and a floor defining a receptacle for carrying a load,
wherein the floor of the load carrying portion has an upper portion and a lower portion separated by a shoulder, wherein the upper portion extends from the first side wall to the second side wall, the upper portion located above the ground engaging wheel and the lower portion located behind the wheel such that a center of gravity for the wheelbarrow is located in close proximity to the wheel such that the force required to lift and move the wheelbarrow is reduced.

7. A wheelbarrow for carrying materials, comprising:
a main frame having first and second spaced-apart elongate longitudinal arms and a support assembly configured to engage the ground when the wheelbarrow is in a stationary position,
a load carrying container for receiving material therein, the load carrying container being mounted to and supported by the main frame and configured for supporting the materials, wherein the main frame extends along an underside of the container to provide support to the container;

an axle mounted to the main frame and below the container, and a ground engaging wheel rotatably mounted on the axle for moving the wheelbarrow when in a mobile position, wherein a hollow interior of the load carrying container has an upper portion and a lower portion, the upper portion being located above the ground engaging wheel and extending along a substantial portion of a width of the container, wherein a volume of the upper portion is between 10% and 50% of a total volume of the hollow interior facilitating placement of a center of gravity of the wheelbarrow behind the axle in the lower portion when the wheelbarrow is in the stationary position.

8. The wheelbarrow of claim 7, wherein the upper portion of the container spans the width of the container.

9. The wheelbarrow of claim 7, wherein an end of the upper portion distal from the lower portion extends beyond an outer most edge of the wheel in a longitudinal direction of the container.

10. The wheelbarrow of claim 7 wherein the lower portion of the container is located below and behind an uppermost edge of the wheel.

11. The wheelbarrow of claim 7, wherein an end of the lower portion adjacent the shoulder is horizontally positioned with respect to the wheel to fall between a horizontal plane extending from the bottom of the wheel and a horizontal plane extending from the top of the wheel when the wheelbarrow is in the stationary position.

12. The wheelbarrow of claim 7, wherein the volume of the upper portion is approximately between 15% and 40% of the volume of container.

13. The wheelbarrow of claim 7, wherein the volume of the upper portion is approximately between 20% and 30% of the volume of container.

14. The wheelbarrow of claim 7, wherein the container comprises a floor having an upper level associated with the upper portion and a lower level associated with the lower portion, and a shoulder portion between the upper level and the lower level.

15. The wheelbarrow of claim 14, wherein the shoulder portion is ramped.

16. The wheelbarrow of claim 14, wherein the upper level is substantially planar.

17. The wheelbarrow of claim 14, wherein the lower level is substantially planar.

18. The wheelbarrow of claim 8, wherein a height of an upper peripheral edge of the container is substantially constant along a substantial length of the edge when the wheelbarrow is in the stationary position.

19. The wheelbarrow of claim 14, wherein the center of gravity of the wheelbarrow (CoG) or an axis of the CoG extending substantially perpendicular to a longitudinal axis of the wheelbarrow (hereinafter referred to as CoG axis), in a stationary and non-lifted state of the wheelbarrow, is located proximate or at the shoulder portion and behind to reduce a distance of an effective lever arm between the CoG axis and the wheel.

20. The wheelbarrow of claim 7, wherein each elongate arm of the main frame extends longitudinally along an underside of the container to provide support to the container.

21. The wheelbarrow of claim 7, wherein each elongate arm of the main frame extends laterally at a user end beyond a rear end of the container each providing an elongate handle laterally spaced apart from the other at the user end.

22. The wheelbarrow of claim 7, wherein the support structure of the main frame comprises first and second leg structures extending laterally from the first and second spaced-apart arms of the main frame respectively.

23. The wheelbarrow of claim 7, further comprising:
an axle support member extending between and connecting to the first and second elongate arms and either end of the axle respectively.

24. The wheelbarrow of claim 7, wherein the load carrying container has a front wall extending beyond an outer most edge of the wheel.

25. The wheelbarrow of claim 7, wherein a distribution of load achieved by the container forms a pivot point for the wheelbarrow located behind and in close proximity to the wheel and below the center of gravity of the wheelbarrow.

26. A wheelbarrow comprising a main frame, a container secured thereto, the container adapted to receive the load, and a wheel rotatably secured to the main frame at a front end, enabling the wheelbarrow to be moved along a surface, the main frame including:
at least two spaced leg members for supporting the wheelbarrow when in a stationary position, and
at least two handles extending in a rearward direction relative to the leg members, each handle being spaced from one another such that an operator may stand there between, the at least two handles being distal from the wheel,
the container including a floor and a side wall extending around the floor, the floor including:
an upper portion having an upper surface located above the wheel when the wheelbarrow is in the stationary position,
a lower portion having a lower surface located below the upper surface and a first end horizontally positioned with respect to the wheel between a horizontal plane extending from the bottom of the wheel and a horizontal plane extending from the top of the wheel when the wheelbarrow is in the stationary position, and
a shoulder portion extending between the upper portion and the lower portion, wherein the shoulder spans a width of the container, wherein the position of the upper portion and the lower portion reduce the force required to move or unload the wheelbarrow.

27. The wheelbarrow according to claim 26, wherein the upper surface is planar.

28. The wheelbarrow according to claim 26, wherein the upper surface is inclined downwardly towards the front of the wheelbarrow.

29. The wheelbarrow according to claim 26, wherein the upper surface extends across the width of the container.

30. The wheelbarrow according to claim 26, wherein the upper surface and the portion of sidewall there around define an upper volume.

31. The wheelbarrow according to claim 30, wherein the upper portion is between 10% and 50% of a total volume of the container.

32. The wheelbarrow according to claim 26, wherein the lower surface is planar.

33. The wheelbarrow according to claim 26, wherein the lower surface is inclined downwardly towards the front of the wheelbarrow.

34. The wheelbarrow according to claim 26, wherein the lower surface extends across the width of the container.

35. The wheelbarrow of claim 1, wherein the shoulder portion is planar.

* * * * *